United States Patent
Kraft et al.

(10) Patent No.: US 7,451,152 B2
(45) Date of Patent: Nov. 11, 2008

(54) SYSTEMS AND METHODS FOR CONTEXTUAL TRANSACTION PROPOSALS

(75) Inventors: Reiner Kraft, Gilroy, CA (US); Andreas Hartmann, San Francisco, CA (US); Frazin Maghoul, Hayward, CA (US)

(73) Assignee: Yahoo! Inc., Sunnyvale, CA (US)

( * ) Notice: Subject to any disclaimer, the term of this patent is extended or adjusted under 35 U.S.C. 154(b) by 342 days.

(21) Appl. No.: 11/129,096

(22) Filed: May 12, 2005

(65) Prior Publication Data
US 2006/0167857 A1 Jul. 27, 2006

Related U.S. Application Data

(63) Continuation-in-part of application No. 10/903,283, filed on Jul. 29, 2004.

(51) Int. Cl.
*G06F 17/30* (2006.01)
(52) U.S. Cl. .................. 707/10; 707/3; 707/102; 709/203; 715/205; 715/234
(58) Field of Classification Search .......... 707/3–5, 707/10, 102, 104.1; 709/203; 715/205, 234; 705/26, 27
See application file for complete search history.

(56) References Cited

U.S. PATENT DOCUMENTS

| | | | |
|---|---|---|---|
| 6,240,412 B1 | 5/2001 | Dyko et al. | |
| 6,957,253 B1* | 10/2005 | Mather | 709/220 |
| 7,319,978 B2* | 1/2008 | Minamishin et al. | 705/26 |
| 2002/0111896 A1* | 8/2002 | Ben-Levy et al. | 705/37 |
| 2002/0169760 A1 | 11/2002 | Cheung et al. | |
| 2003/0216932 A1* | 11/2003 | Foley | 705/1 |
| 2005/0021445 A1* | 1/2005 | Caro | 705/37 |
| 2005/0055299 A1* | 3/2005 | Chambers et al. | 705/36 |
| 2006/0080214 A1* | 4/2006 | Hausman et al. | 705/37 |

* cited by examiner

*Primary Examiner*—Cheryl Lewis
(74) *Attorney, Agent, or Firm*—Brinks Hofer Gilson & Lione

(57) ABSTRACT

Context-specific transaction proposals are automatically generated and presented to a user who expresses interest in a particular topic. A user viewing a World Wide Web page or other content item activates an interface to indicate that he or she is interested in additional information related to the subject of the page. A context vector or other representation of the content of the page being viewed is transmitted to an information server, which identifies possible transactions related to the content and proposes one or more of these transactions to the user. Transaction proposals can be presented together with a contextual search interface that allows the user to submit zero or more search terms together with the context vector as a search query.

29 Claims, 14 Drawing Sheets

| 402 | 404 | 406 | 408 | 410 |
|---|---|---|---|---|
| cabrio | 11 | 1 | 0.0153846153846 | TEXT |
| golf | 6 | 1 | 0.0153846153846 | TEXT |
| vw | 3 | 1 | 0.0153846153846 | TEXT |
| like | 2 | 1 | 0.0153846153846 | TEXT |
| followed | 2 | 1 | 0.0153846153846 | TEXT |
| production | 2 | 1 | 0.0153846153846 | TEXT |
| 1 | 2 | 1 | 0.0153846153846 | TEXT |
| now | 2 | 1 | 0.0153846153846 | TEXT |
| scirocco | 2 | 1 | 0.0153846153846 | TEXT |
| type | 2 | 1 | 0.0153846153846 | TEXT |

Entertainment

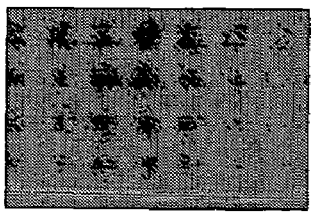 Bono Denies Plans for a 'Live Aid 2' Concert
Reuters -Tue Jun 1, 10:16 AM ET
Irish rock star Bono played down rumors on Tuesday that he and his friends in the music industry are planning a second Live Aid concert to raise money to fight AIDS. — 602

 Search This
— 612

Sports

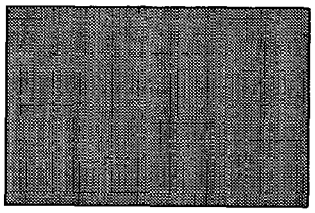 Williams Sisters Lose at French Open
AP - 37 minutes ago
Venus Williams again came up short in a bid for her first Grand Slam title since 2001, losing to Anastasia Myskina 6-3, 6-4 Tuesday in the Roland Garros quarterfinals.. — 604

 Search This
— 614

Technology

PluggedIn: Sun Powers Gadgets on Peaks, in Valleys
Reuters - 50 minutes ago
Gadget lovers are using solar panels to power their toys in the remotest places — like Mt. Everest, altitude 29,029 feet. — 606

 Search This
— 616

FIG. 6

Entertainment

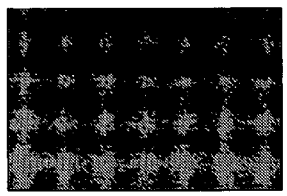

Bono Denies Plans for a 'Live Aid 2' Concert
Reuters -Tue Jun 1, 10:16 AM ET
Irish rock star Bono played down rumors on Tuesday that he and his friends in the music industry are planning a second Live Aid concert to raise money to fight AIDS.

Search This

[ 1204 ]   [Related Search] 1206

---

Shop in Context:

(What's this?)  (Become a sponsor)

• Bono - $12.69  Make O~~~~~ your one-stop shop for all your media needs. Find the latest book, movie, music and gaming titles at deep discounts. Flat-rate shipping. O~~~~~ - your online outlet.
*www.domain7.com*

• Bono and U2 Items on E~~~~ Bono and U2 items and more, now for sale on E~~~~. Find millions of products at low prices - all on E~~~~, the online marketplace
*www.domain8.com*

Sports

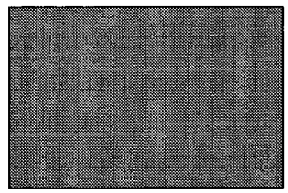

Williams Sisters Lose at French Open
AP - 37 minutes ago
Venus Williams again came up short in a bid for her first Grand Slam title since 2001, losing to Anastasia Myskina 6-3, 6-4 Tuesday in the Roland Garros quarterfinals..

Search This

[ 1214 ]   [Related Search] 1216

---

Shop in Context:

(What's this?)  (Become a sponsor)

• Buy Serena & Venus Williams Posters  Shop for 1,000's of sports posters at A~~~~. We've got posters of all your favorite teams and sports stars. A~~~~ is your one-stop super store for posters and framing.
*www.domain8.com*

• Rent Venus Williams DVDs - Free Trial  N~~~~~: Rent as many DVDs as you want for just $22/month. Over 20,000 titles, choose from classics to new releases. No late fees ever. Free shipping both ways.
*www.domain9.com*

FIG. 12

Yahoo! My Yahoo! Mail

Welcome, user42
[Sign Out, My Account]

1300

---

NEWS: Top Stories

Strong Indonesia Quake Forces Evacuations
AP - 28 minutes ago
A major earthquake struck off the west coast of Indonesia's Sumatra Island late Monday, and officials issued a tsunami warning for as far away as Sri Lanka. Residents of Banda Aceh fled their homes in panic. — 1302

📄 Full Coverage

🔍 Related Results —— 1306

---

SPORTS: Top Stories

Donald Leads Windy Players Championship
AP - 57 minutes ago
Luke Donald waited five days to hold the third-round lead at The Players Championship. Now, he'll try to avoid a fate like Bob Tway's 12 on No. 17's famed island green if he hopes to win golf's "fifth major." — 1304

📄 Full Coverage

🔍 Related Results —— 1308

FIG. 13

Yahoo! My Yahoo! Mail

YAHOO! NEWS
Welcome, user42
[Sign Out, My Account]

1300

YAHOO!

---

NEWS: Top Stories

Strong Indonesia Quake Forces Evacuations
AP - 28 minutes ago
A major earthquake struck off the west coast of Indonesia's Sumatra Island late Monday, and officials issued a tsunami warning for as far away as Sri Lanka. Residents of Banda Aceh fled their homes in panic. — 1402

Full Coverage

Related Results

Also try: PGA tour, Players Championship, Luke Donald, Tiger Woods

Related Sites  1404

1. PGATOUR.com: The Players Championship
features course information, dates and more ...

2. PGA Tour
official site with golf scores, tournament coverage ...  — 1406

3. Tournament Players Club
reserve tee times at your favorite TPC golf courses ...

More ... — 1408

Related Transactions  / 1410

1. Book a tee time at TPC Sawgrass (www.domain1.com)

2. Buy golf balls at wholesale prices (www.domain2.com)

/ 1412        / 1414
[                    ]  [ Related Search ]

SPORTS: Top Stories

Donald Leads W
AP - 57 minutes ago
Luke Donald waited f
Players Championshi
Tway's 12 on No. 17'
"fifth major."

Full Coverage

Related Results

FIG. 14

SYSTEMS AND METHODS FOR CONTEXTUAL TRANSACTION PROPOSALS

CROSS-REFERENCES TO RELATED APPLICATIONS

This application is a continuation-in-part of U.S. patent application Ser. No. 10/903,283, filed Jul. 29, 2004, entitled "Search Systems and Methods Using In-Line Contextual Queries," which disclosure is incorporated herein by reference for all purposes.

This application is also related to the following commonly-assigned U.S. Patent Applications:
application Ser. No. 11/033,417, filed Jan. 10, 2005, entitled "User Interfaces for Search Systems Using In-Line Contextual Queries"; and
application Ser. No. 11/033,100, filed Jan. 10, 2005, entitled "Search Systems and Methods with Enhanced Contextual Queries."

The respective disclosures of these applications are incorporated herein by reference for all purposes.

BACKGROUND OF THE INVENTION

The present invention relates in general to information delivery systems, and in particular to systems and methods for proposing transactions based on context information received from a user.

The World Wide Web (Web), as its name suggests, is a decentralized global collection of interlinked information—generally in the form of "pages" that may contain text, images, and/or media content—related to virtually every topic imaginable. A user who knows or finds a uniform resource locator (URL) for a page can provide that URL to a Web client (generally referred to as a browser) and view the page almost instantly. Since Web pages typically include links (also referred to as "hyperlinks") to other pages, finding URLs is generally not difficult.

What is difficult for most users is finding URLs for pages that are of interest to them. The sheer volume of content available on the Web has turned the task of finding a page relevant to a particular interest into what may be the ultimate needle-in-a-haystack problem. To address this problem, an industry of search providers (e.g., Yahoo!, MSN, Google) has evolved. A search provider typically maintains a database of Web pages in which the URL of each page is associated with information (e.g., keywords, category data, etc.) reflecting its content. The search provider also maintains a search server that hosts a search page (or site) on the Web. The search page provides a form into which a user can enter a query that usually includes one or more terms indicative of the user's interest. Once a query is entered, the search server accesses the database and generates a list of "hits," typically URLs for pages whose content matches keywords derived from the user's query. This list is provided to the user. Since queries can often return hundreds, thousands, or in some cases millions of hits, search providers have developed sophisticated algorithms for ranking the hits (i.e., determining an order for displaying hits to the user) such that the pages most relevant to a given query are likely to appear near the top of the list. Typical ranking algorithms take into account not only the keywords and their frequency of occurrence but also other information such as the number of other pages that link to the hit page, popularity of the hit page among users, and so on.

To further facilitate use of their services, some search providers now offer "search toolbar" add-ons for Web browser programs. A search toolbar typically provides a text box into which the user can type a query and a "Submit" button for submitting the query to the search provider's server. Once installed by the user, the search toolbar is generally visible no matter what page the user is viewing, enabling the user to enter a query at any time without first navigating to the search provider's Web site. Searches initiated via the toolbar are processed in the same way as searches initiated at the provider's site; the only difference is that the user is spared the step of navigating to the search provider's site.

While automated search technologies can be very helpful, they do have a number of limitations, a primary one being that users struggle to convey enough contextual information to direct the search to relevant content. An overly broad query (too little context) can return a few needles of relevant content buried in a haystack of irrelevant hits; an overly narrow query (too much context) may result in filtering out the needles along with the hay. Often a user has a fairly specific context in mind, but this specific context may not be reflected in a query. For example, a user who enters the query "jaguar" might be thinking of the automobile, the animal, the professional football team, or something else entirely.

In principle, contextual information might be gleaned from what the user was doing prior to entering the query. It is well known that users are often inspired to conduct searches when information they are currently reviewing raises a further question. For example, a user who enters the query "jaguar" after (or while) viewing an automobile-related page is most likely interested in the automobile while one who enters the same query after (or while) viewing a page about zoos is most likely interested in the animal. Existing search technologies do not provide reliable ways of gathering such contextual information or using it to respond to a query.

Therefore, it would be desirable to provide a search server with contextual information that is usable for responding to queries and other requests by users for related information.

BRIEF SUMMARY OF THE INVENTION

Embodiments of the present invention provide automatically generated context-specific transaction proposals that can be presented to a user who expresses interest in a particular topic. A user viewing a content item (e.g., a World Wide Web page) activates an interface to indicate that he or she is interested in additional information related to the subject of the content item. A context vector (or other representation of the content of the item being viewed) is transmitted to a server, which identifies possible transactions related to the content and proposes one or more transactions to the user. In some embodiments, the transaction proposals are advantageously presented together with a contextual search interface that allows the user to submit zero or more search terms together with the context vector as a search query.

According to one aspect of the invention, a method for communicating transaction proposals to a user is performed by an information server computer. For each of a number of partners, partner data is stored in a location accessible to the information server computer. The partner data represents products available from that partner. The information server computer receives a request from a user for information related to a currently presented content item, the request including context data representing content of the currently presented content item. At least one of the partners is selected as a transaction partner, with the selection being based at least in part on comparing the context data to the stored partner data for the plurality of partners. At least one transaction proposal is obtained from each transaction partner by the information server, and a representation of at least one of the obtained transaction proposals is transmitted to the requesting user. The content item might be, for example, a World Wide Web page or other document from a corpus, and the user can make the request for information, e.g., by activating a contextual search interface included in the currently presented World Wide Web page. The user might be a human or a computer (or a human operating a computer).

The transaction proposals can take various forms. In some embodiments, each transaction proposal includes a transaction page configured to present terms of a proposed business transaction between the user and the transaction partner. The proposed business transaction may be, e.g., for a purchase of goods or services by the user. The representation of the proposal that is transmitted to the user might include the page or a resource identifier (e.g., URL) of the transaction page. The resource identifier can be transmitted directly by the information server to the user, or the information server can transmit the resource identifier of the transaction page to an intermediary server, which includes the resource identifier as special content to be transmitted to the user. In one embodiment, a link to the transaction page is inserted into the currently presented content item. In another embodiment, an instruction to display a link to the transaction page in an overlay window is transmitted. The overlay window might include other information or a search interface for performing a contextual search.

In one embodiment, the act of obtaining a transaction proposal includes, for each transaction partner, formulating a query, the query being based at least in part on the context data. Each query is submitted to a partner server associated with the transaction partner. A response to the query is received from the partner server; the response includes at least one transaction proposal. At least one of the received transaction proposals is selected for transmission to the requesting user. In some embodiments, the act of selecting at least one of the received transaction proposals includes generating a representation of content of each received transaction proposal and determining relevance of each received transaction proposal based at least in part on comparing each generated representation to the context data received from the user; the transaction proposal determined to be most relevant is advantageously selected.

Partner data can be obtained in various ways; for instance, it can be supplied by the partner. Alternatively, partner data for some or all partners might be generated based on a data dump from a partner server associated with the partner.

According to another aspect of the present invention, a system for communicating transaction proposals to a user includes a data store, partner selection control logic and partner interaction control logic. The data store is configured to store information about each of a number of partners, the information including partner data for each partner, the partner data representing products available from that partner. The partner selection control logic, which is communicably coupled to the data store, is configured to receive a user request for information, the request including context data representing content of a currently presented content item, and to select at least one of the partners as a transaction partner, with the selection being based at least in part on comparing the context data to the partner data in the data store. The partner interaction control logic is coupled to receive identifiers of the selected transaction partners from the partner selection logic and is configured to obtain at least one transaction proposal from each transaction partner and to transmit at least one of the obtained transaction proposals to the requesting user.

In some embodiments, each transaction proposal includes a transaction page configured to present terms of a proposed business transaction between the user and the partner. The proposed business transaction might be, e.g., for a purchase of goods or services by the user. The representation transmitted to the user may include the transaction page itself, or a resource identifier (e.g., URL) of the transaction page, allowing the user to navigate to the transaction page.

In some embodiments, the partner interaction control logic is further configured to formulate a query for each transaction partner, with the query being based at least in part on the context data. The partner interaction control logic submits the query to a partner server associated with the transaction partner and receives a response to the query from the partner server, the response including at least one transaction proposal. The partner interaction control logic then selects at least one of the received transaction proposals for transmission to the requesting user. The partner interaction control logic may be further configured to select at least one of the received transaction proposals by generating a representation of content of each received transaction proposal and determining relevance of each received transaction proposal based at least in part on comparing each generated representation to the context data received from the user, with the transaction proposal determined to be most relevant being selected for transmission to the user.

According to a further aspect of the present invention, a computer implemented method for communicating a transaction proposal to a user includes presenting to a user, by a client computer, a content item including an activatable icon, the icon being associated with content of the presented content item. In response to user activation of the icon, the client computer transmits context data representing the associated content to an information server. The client computer receives a response from the information server, the response including a reference to a transaction proposal, the transaction proposal being selected based at least in part on the context data. The client computer presents to the user an interface including the reference to the transaction proposal. The user might be a human or a computer (or a human operating a computer).

In some embodiments, each transaction proposal includes a transaction page configured to present terms of a proposed business transaction between the user and the transaction partner. The proposed business transaction might be, e.g., for a purchase of goods or services by the user.

The content item might be, e.g., a hosting World Wide Web page or a document in another corpus, and the reference might be, e.g., a hyperlink to a transaction Web page configured to present terms of a proposed business transaction between the user and the transaction partner. The hyperlink can be included in a special content data block inserted into the hosting Web page or presented in an overlay window.

In some embodiments, the reference to the transaction proposal is presented together with a contextual search interface configured to enable the user to search at least a portion of the World Wide Web using the context data and zero or more user supplied search terms.

The following detailed description together with the accompanying drawings will provide a better understanding of the nature and advantages of the present invention.

BRIEF DESCRIPTION OF THE DRAWINGS

FIG. 6 is an illustration of a Web page with multiple contextual search interfaces according to an embodiment of the present invention.

FIG. 12 is an illustration of a Web page with contextual search interfaces including content according to an embodiment of the present invention.

FIG. 13 shows a hosting page with inactive contextual search interfaces according to another embodiment of the present invention.

FIG. 14 illustrates an active contextual search interface for the hosting page of FIG. 13 according to an embodiment of the present invention.

DETAILED DESCRIPTION OF THE INVENTION

I. Overview

A. Network Implementation

Figure 1:
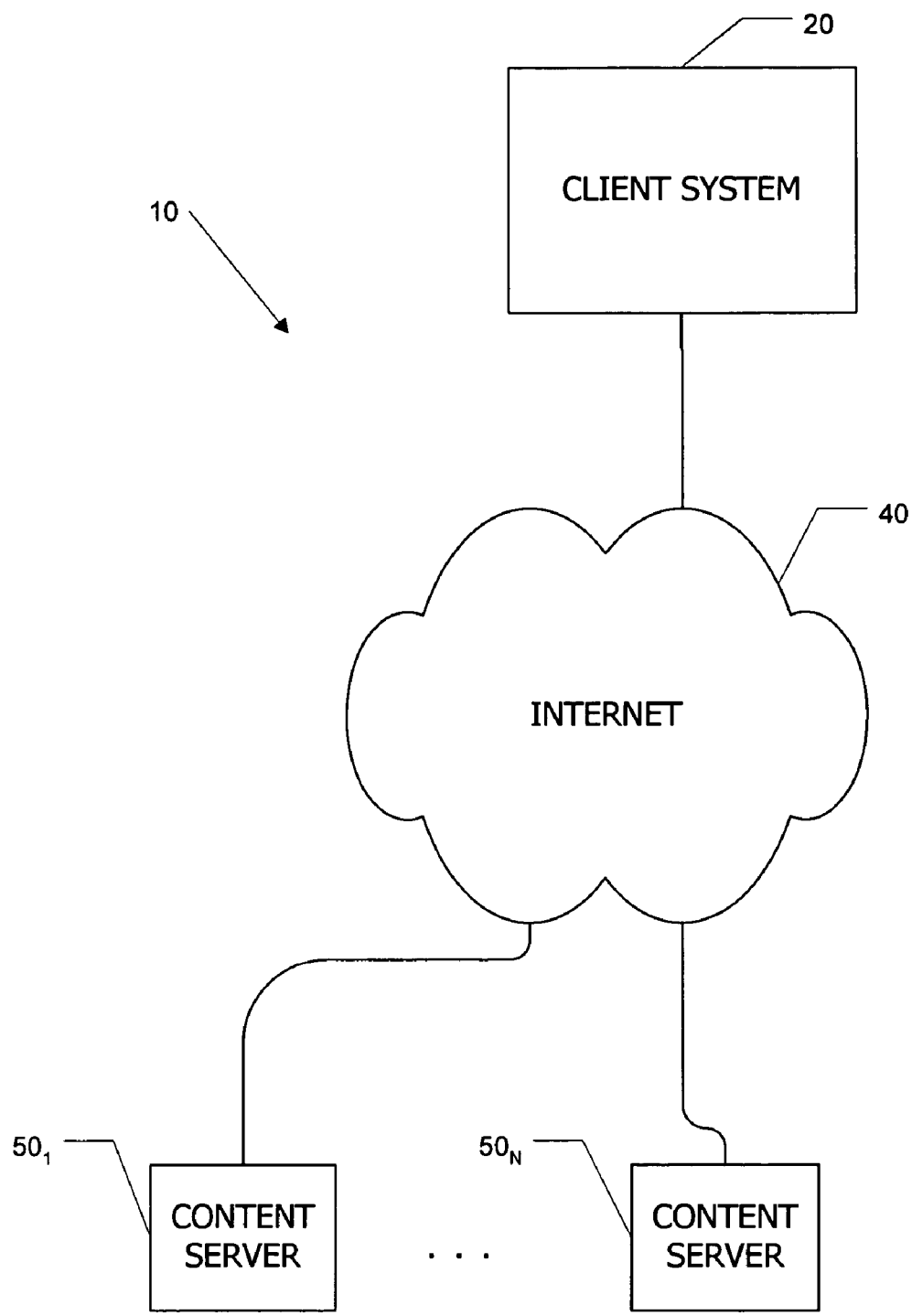
FIG. 1 is a high-level block diagram of an information retrieval and communication network including a client system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any local area network (LAN) or wide area network (WAN) connection, to any number of server systems 501 to 50N. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, personal digital assistant (PDA), cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla Firefox™ browser, Opera™ browser, or a WAP-enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touch screen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet, or transmitted over any other network connection (e.g., extranet, VPN, LAN, or other conventional networks) using any communication medium and protocols (e.g., TCP/IP, HTTP, HTTPS, Ethernet, or other conventional media and protocols).

It should be appreciated that computer code for implementing aspects of the present invention can be C, C++, HTML, XML, Java, JavaScript, etc. code, or any other suitable scripting language (e.g., VBScript), or any other suitable programming language that can be executed on client system 20 or compiled to execute on client system 20. In some embodiments, no code is downloaded to client system 20, and needed code is executed by a server, or code already present at client system 20 is executed.

B. Search System

Figure 2:
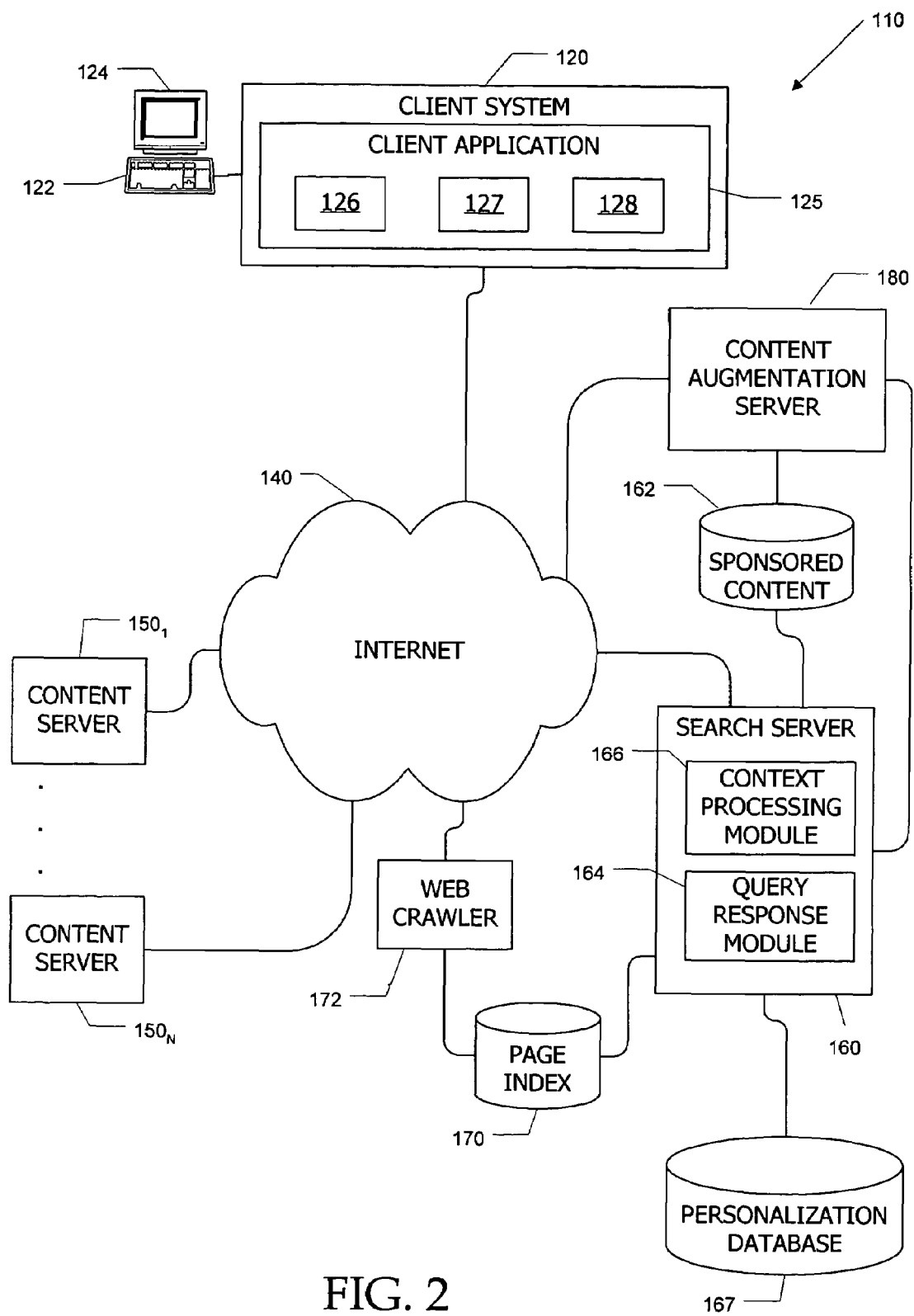
FIG. 2 is a block diagram of another information retrieval and communication network according to an embodiment of the invention.

FIG. 2 illustrates another information retrieval and communication network 110 for communicating media content according to an embodiment of the invention. As shown, network 110 includes client system 120, one or more content server systems 150, and a search server system 160. In network 110, client system 120 is communicably coupled through Internet 140 or other communication network to server systems 150 and 160. As discussed above, client system 120 and its components are configured to communicate with server systems 150 and 160 and other server systems over Internet 140 or other communication networks.

1. Client System

According to one embodiment, a client application (represented as module 125) executing on client system 120 includes instructions for controlling client system 120 and its components to communicate with server systems 150 and 160 and to process and display data content received therefrom. Client application 125 may be transmitted and downloaded to client system 120 from a software source such as a remote server system (e.g., server systems 150, server system 160 or other remote server system), or client application module 125 may also be provided on any software storage medium (floppy disk, CD, DVD, etc.) that is readable by client system 120 as discussed above. For example, in one aspect, client application 125 may be provided over Internet 140 to client system 120 in an HTML wrapper including various controls such as, for example, embedded JavaScript or ActiveX controls, for manipulating data and rendering data in various objects, frames and windows.

Client application module 125 advantageously includes various software modules for processing data and media content. In one embodiment, these modules include a specialized search module 126, a user interface module 127, and an application interface module 128. Specialized search module 126 is configured for processing search requests (also referred to herein as queries) to be sent to search server 160 and search result data received from search server 160. Specific aspects of specialized search module 126 are described below.

User interface module 127 is configured for rendering data and media content in text and data frames and active windows, e.g., browser windows and dialog boxes. In some embodiments, user interface module 127 includes or communicates with a browser program, which may be a default browser configured on client system 120 or a different browser. Application interface module 128 is configured to support interfacing and communicating between client application 125 and various other applications executing on client 120, such as e-mail applications, instant messaging (IM) applications, browser applications, document management applications and others.

User interface module 127 advantageously provides user input interfaces allowing the user to enter queries for processing by search server system 160. For example, where user interface module 127 includes or communicates with a browser, the user may be able to enter a URL or activate a control button to direct the browser to a Web search page (or site) from which the user can submit a query to search server system 160 for processing. In addition or instead, user interface module 127 may include a search toolbar or other interface via which the user can enter and submit a query without first navigating to the search page. Queries entered using user interface module 127 may be preprocessed by specialized search module 126 prior to being sent to search server system 160, e.g., to remove so-called "stop words" ("the," "and," etc.), to correct spelling errors, or the like.

In some embodiments, client application 125 may include various features for adding context data (referred to herein as a "context vector") to the user's queries. For example, specialized search module 126 may be configured to generate context vectors based on content the user is currently viewing at the time a query is entered. As another example, in some embodiments of the present invention, Web pages displayed in the browser may include one or more context vectors that can be used to supplement user-entered queries. User interface module 127 may be configured to detect such context vectors in a page being displayed and use context vector data to supplement a query entered by the user. These and other features are described further below.

2. Search Server System

According to one embodiment of the invention, search server system 160 is configured to provide search result data and media content to client system 120, and content server system 150 is configured to provide data and media content such as web pages to client system 120, for example, in response to links selected by the user in search result pages provided by search server system 160. In some variations, search server system 160 returns content as well as, or instead of, links and/or other references to content.

Search server system 160 references various page indexes 170 that are populated with, e.g., pages, links to pages, data representing the content of indexed pages, etc. Page indexes may be generated by various collection technologies such as an automatic web crawler 172; in addition, manual or semiautomatic classification algorithms and interfaces may be provided for classifying and ranking web pages within a hierarchical category structure. Such technologies and algorithms may be of generally conventional design, and a detailed description is omitted as not being critical to the present invention.

In one embodiment, an entry in page index 170 includes a search term, a reference (e.g., a URL or other encoded identifier) to a page in which that term appears and a context identifier for the page. The context identifier may be used for grouping similar results for search terms that may have different meanings in different contexts. For example, the search term "jaguar" may refer to the British automobile, to an animal, to a professional football team, and so on. The context identifier for a page can be used to indicate which of these contexts is applicable. In one embodiment, the context identifier includes a category for the page, with the category being assigned from a predefined hierarchical taxonomy of content categories. A page reference may be associated with multiple context identifiers, so the same page (or a link thereto) may be displayed in multiple contexts. In some embodiments, context identifiers are automatically associated with page links by the system as users perform various searches; the identifiers may also be modified and associated with links manually by a team of one or more index editors.

Search server system 160 is configured to provide data responsive to various search requests received from a client system 120, in particular from search module 126 and/or user interface module 127. For example, search server system 160 may include a query response module 164 that is configured with search related algorithms for identifying and ranking Web pages relative to a given query, e.g., based on a combination of logical relevance (which may be measured by patterns of occurrence of search terms in the query), context identifiers, page sponsorship, etc.

In some embodiments, query response module 164 is also configured to receive and make use of context vector data that may be provided in association with a query in order to further enhance the response to queries. Use of context vector data in responding to queries is described further below. Query response module 164 may also enhance search result information with additional information (e.g., links and/or advertising copy) obtained from a sponsored content database 162. Sponsored content database 162 may be implemented as part of page index 170 by the inclusion of additional fields in each entry to identify page references that are sponsored and keywords for triggering the display of sponsored content, or it may be implemented in a separate database.

In some embodiments, search server 160 also includes a context processing module 166 that is configured with various algorithms for processing received content to generate a context vector representative of the received content. In general, a context vector may include any data that represents all or part of the content. For example, one embodiment of a context vector for text content may include keywords such as terms (e.g., words or phrases) that appear in the content, and each such term may have an associated frequency count or a weight based on term frequency (the number of times the term occurs in the received content) and/or document frequency (e.g., the number or fraction of documents in the corpus that contain that term) and/or other parameters reflecting the likelihood that a particular term is a reliable indicator of context. Other types of data may also be included, e.g., URLs or other data identifying any links that may be included in the content, the URL or other identifier of the page that contains the content, category data associated with the content or with a page that contains the content, and so on.

In some embodiments, a content augmentation server 180 is also provided. Content augmentation server 180 communicates with search server 160 and/or client application 125 to enhance the content of a Web page being displayed with "special content" that is advantageously selected based on a context vector (or other representation of context data) associated with the displayed page or with a portion thereof. In circumstances where the user has explicitly indicated an interest in information related to a particular context (examples are described below), client application 125 or search server 160 transmits a context vector to content augmentation server 180, and content augmentation server 180 responds by identifying special content to be added to a Web page being displayed by client application 125.

In one embodiment, content augmentation server 180 and search server 160 are under common control, and content augmentation server 180 selects special content from sponsored content database 162. In another embodiment, content augmentation server 180 may have its own store of data from which selections of special content can be made dynamically, based on context vectors provided by client application 125. In still other embodiments, content augmentation server 180 is operated independently of search server 160 and communicates with client application 125 via Internet 140.

It will be appreciated that the search system described herein is illustrative and that variations and modifications are possible. The content server, search server, and content augmentation server systems may be part of a single organization, e.g., a distributed server system such as that provided to users by Yahoo! Inc., or they may be part of disparate organizations. Each server system generally includes at least one server and an associated database system, and may include multiple servers and associated database systems, and although shown as a single block, may be geographically distributed. For example, all servers of a search server system may be located in close proximity to one another (e.g., in a server farm located in a single building or campus), or they may be distributed at locations remote from one another (e.g., one or more servers located in city A and one or more servers located in city B). Thus, as used herein, a "server system" typically includes one or more logically and/or physically connected servers distributed locally or across one or more geographic locations; the terms "server" and "server system" are used interchangeably.

The search server system may be configured with one or more page indexes and algorithms for accessing the page index(es) and providing search results to users in response to search queries received from client systems. The search server system might generate the page indexes itself, receive page indexes from another source (e.g., a separate server system), or receive page indexes from another source and perform further processing thereof (e.g., addition or updating of the context identifiers).

A content augmentation server can be implemented in the same computer system as the search server or in a different server, and the content augmentation server may communicate with a client system via the search server or independently of the search server. The content augmentation server advantageously maintains various data stores containing information and rules used to select special content given a particular context vector (or other representation of context data). Examples of such information and rules are described below.

C. Contextual Search Interface

As mentioned above, user interface module 127 of client application 125 generally includes one or more interfaces enabling the user to submit queries to search server 160, e.g., by navigating a browser to a search page hosted by search server 160 or by operating a toolbar interface for query submission. Such interfaces may be implemented in a generally conventional fashion.

In accordance with some embodiments of the present invention, in addition to (or instead of) such interfaces, users may also enter contextual queries using a "contextual search" interface that may be implemented as a visible element on any "hosting" Web page. (As used herein, the term "hosting Web page," or "hosting page," is to be understood as referring to any page that includes at least one contextual search interface; hosting pages might or might not be under common control with search server 160 or content augmentation server 180.) Each contextual search interface has a context vector associated with it. The context vector, which need not be visible on the hosting page, provides additional data reflecting the content of the hosting page (or a portion thereof). This data can be used, e.g., by query response module 164, during query processing as described below.

Figures 3, 4:
FIG. 3 is an illustration of a Web page with a contextual search interface according to an embodiment of the present invention.
FIG. 4 is an illustration of a context vector for a contextual search according to an embodiment of the present invention.

An example of a contextual search interface will now be described. FIG. 3 shows a hosting page 300 that has some content 302, as it might appear when displayed on client system 120 of FIG. 2. Hosting page 300 includes a contextual search interface 304 that is advantageously placed near content 302. A user may initiate a contextual search by entering a query (e.g., "fuel consumption") into a text field 306 of interface 304 and activating a "submit" control 308, which may be, e.g., a clickable button. The source code (not shown) for hosting page 300 includes a context vector associated with contextual search interface 304. In this embodiment, the context vector is not actually displayed in page 300, although its data is included with the source code provided to client application 125 when page 300 is requested.

The context vector, which may be implemented in various ways, advantageously includes one or more terms and/or category labels (or any other data) representative of the neighboring content 302. FIG. 4 is an example of a context vector 400 that might be provided for a search initiated from contextual search interface 304 of FIG. 3. Context vector 400 includes a list of terms 402 ("cabrio," "golf," etc.) that appear in content 302 and additional information associated with each term. In this example, the additional information includes a term frequency 404, a document frequency 406, a weight 408, and a term type 410. Term frequency 404 reflects the number of times the term occurs in content 302. Document frequency 406 reflects the number of documents in the search corpus that contain the term. Weight 408 reflects an importance assigned to the term and may be computed from information such as whether the term occurs in text or in headings, the term frequency 404, and/or the document frequency 406. Term type 410 can be used to distinguish different types of data that may be included in the context vector, e.g., terms from the text, category data, URL data, and so on. It is to be understood that a context vector may also include more, fewer, or different elements from those shown in FIG. 4, and the elements may be provided in any desired format. In one embodiment, context vector 400 is included in the source code for hosting page 300 in association with the code for contextual search interface 304.

When a user using client application 125 (of FIG. 2) to view hosting page 300 initiates a search by entering a query into text field 306 and activating submit control 308, the query that is sent by client application 125 to search server 160 for processing advantageously includes not only the explicit user input from text field 306 but also a representation of context vector 400. For example, in one implementation of contextual search interface 304, Web page 300 includes program code for sending an HTTP (hypertext transport protocol) request to search server 160 in response to submit control 308. This program code can include code for appending the user's query and a representation of the context vector as additional data to the URL used for the HTTP request.

In addition to the user's query (from text field 306) and context vector 400, search server 160 may also receive other metadata, such as an identifier of the user (if known), the user's IP address, the time of day, and so on. This metadata, which might or might not be specific to the hosting page or the contextual search interface, may be obtained from client application 125 or from other sources.

Upon receiving a query initiated through contextual search interface 304, search server 160 uses query response module 164 to execute a search based on the user's query and the context vector (and optionally any other available metadata). Query response module 164 generates and ranks a list of hits. The resulting list of hits, which generally depends at least in part on the context vector, is returned to the user, e.g., in the form of a search results page. In executing the search, the context vector may be used in various ways. For instance, in one embodiment, the user's query (e.g., the explicit input in text field 306 in FIG. 3) is modified by adding one or more keywords selected from the context vector; in another embodiment, the search is executed using the user's query as submitted, with keywords and/or category data from the context vector used in ranking the results. Additional embodiments are described below.

Figure 5:
FIG. 5 is an illustration of a Web page with a contextual search interface in an inactive state according to an embodiment of the present invention.

In some embodiments, contextual search interfaces for a hosting page may be initially displayed in an "inactive" state in which only a relatively small icon appears on the page. An example of an inactive contextual search interface is illustrated in FIG. 5. Hosting page 300' is generated from the same source code as hosting page 300 of FIG. 3 and has the same content 302. In page 300', however, only a small contextual search icon 504 is displayed, rather than the full contextual search interface 304 shown in FIG. 3. Icon 504 represents an inactive contextual search interface; a user viewing page 300' who desires to perform a contextual search related to content 302 can activate the contextual search interface, e.g., by clicking on or otherwise selecting icon 504. Selecting icon 504 causes page 300 of FIG. 3, with the active contextual search interface 304, to be displayed so that the user can perform a contextual search.

Any number of contextual search interfaces may be provided on a hosting page, and each contextual search interface may have its own context vector that reflects the nearby content. For example, FIG. 6 shows a hosting page 600 whose content includes several summaries 602, 604, 606 of different news stories. Each summary 602, 604, 606 has a respective contextual search icon 612, 614, 616 placed near it. Each icon 612, 614, 616 is the inactive state of a different contextual search interface, each of which has its own context vector derived from the adjacent summary 602, 604, 606. Any one of these icons can be activated by a user and then used to initiate a contextual search (e.g., in the same manner as described above with reference to icon 504 and active contextual search interface 304). The context vector for a search initiated from icon 612 is advantageously derived from summary 602 while the context vector for a search initiated from icon 614 is advantageously derived from summary 604 and so on. Since icons 612 and 614 have different associated context vectors, the search results (the hits or their ranking or both) will generally differ for searches initiated via icons 612 and 614, even if the same query is entered.

In one embodiment, described further below, the creator of a hosting page (referred to herein as a "webmaster") may determine how many contextual search interfaces to include on the page, where they are to be located, and which portion(s) of the page should be used to define the context for the search.

The following sections describe example embodiments for creation of contextual search interfaces and context vectors (Section II), use of context vectors in processing queries (Section III), augmented or special content for contextual search interfaces (Section IV) and additional optional features for further enhancing contextual searches (Section V).

II. Creation of Contextual Search Interfaces and Context Vectors

A. By Content Providers

In some embodiments, one or more contextual search interfaces can be added to a Web page at the discretion of a content developer that creates the Web page. For example, a search provider (or other promulgator of contextual search technologies) may publish an application program interface (API) for implementing contextual searches. The API includes a format for specifying contextual search requests so that such requests can be recognized and processed by search server 160. In one embodiment, the API specifies a base URL for submitting contextual searches to search server 160 and a format for enhancing the base URL with additional data representing the user's query and the context vector. The API may also specify formats for encoding the query and/or context vector as appropriate to a particular implementation.

In some embodiments, the API may also specify the appearance and/or features of the contextual search interface. For example, the API might specify whether the interface should initially be displayed as an inactive-state icon, what such an icon should look like, and a standard phrase to be displayed with the icon to alert users to the opportunity for performing a contextual search. Other aspects of the API might specify features of the contextual search interface in its active state, such as whether a text box and/or other input fields are to be provided and what such fields should look like. While optional, providing uniform specifications for the esthetic aspects of contextual search may assist in promoting user awareness and recognition of contextual search interfaces.

All or part of the API may be provided by making available images that can be inserted into the Web page or suitable code blocks in commonly used Web page coding languages (such as HTML) that content creators can simply insert into their pages.

The content provider can implement a contextual search interface by including appropriate code in the source code for the hosting page and supplementing this code with appropriate data for a context vector representing the actual content of the hosting page. Any code in any language may be used, as long as execution of the code results in contextual search requests, in the API-compliant format, being generated and submitted to search server 160 in response to input to the contextual search interface.

Figure 7:
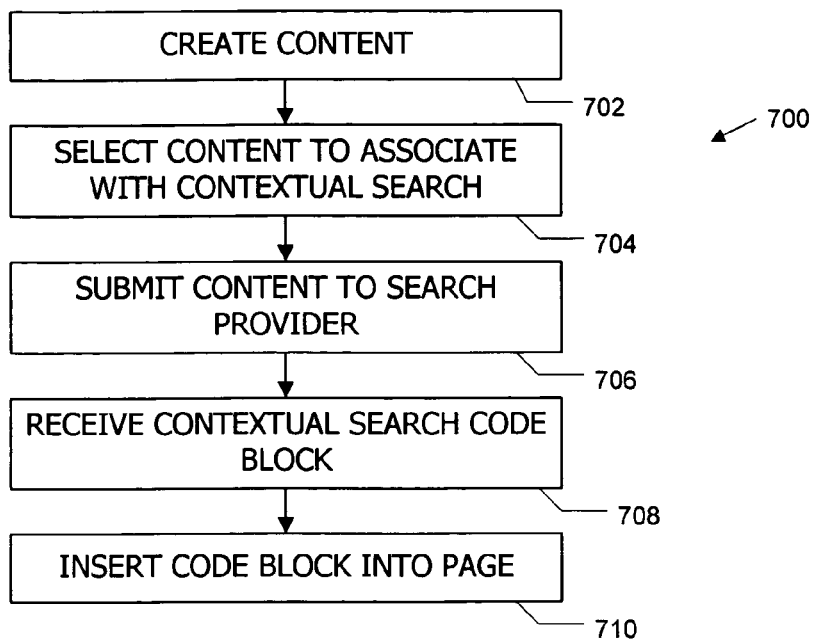
FIG. 7 is a flow diagram of a process performed by a content developer for creating a contextual search interface according to an embodiment of the present invention.
Figure 8:
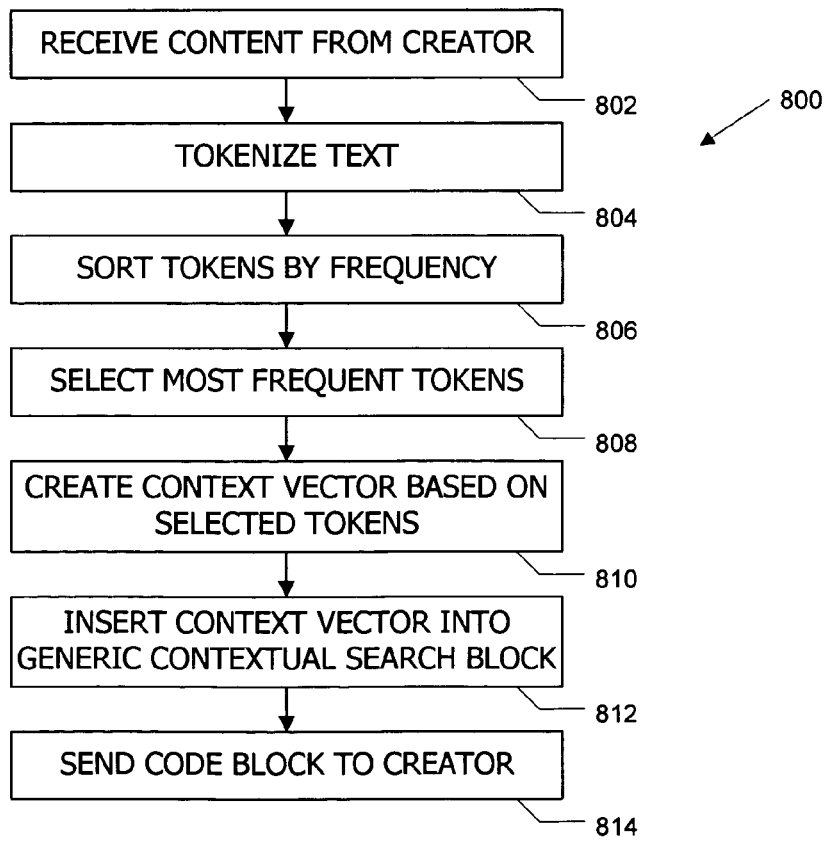
FIG. 8 is a flow diagram of a process for generating a context vector according to an embodiment of the present invention.

In other embodiments, the search provider (or other promulgator of contextual search technologies) further facilitates creation of contextual search interfaces by content providers, e.g., by automating the generation of some or all of the contextual search code for a hosting page. As one example, generation of context vectors from hosting page content may advantageously be automated. FIGS. 7 and 8 are flow diagrams illustrating a partially automated process for creating a contextual search interface, with FIG. 7 showing a process 700 performed by the content developer and FIG. 8 showing a process 800 performed by the search provider.

Process 700 begins with the content developer creating or modifying content for a Web page (step 702) that is to include a conceptual search interface. The content may be created using any manual or automatic technique, including the use of conventional Web development software. At some point, the content developer determines that it would be desirable to have a contextual search interface associated with some portion (or all) of the hosting Web page's content. The content developer selects the content that is to be associated with the contextual search interface (step 704) and submits it to the search provider (step 706).

Submission of content to the search provider may be done in a number of ways. In some embodiments the search provider offers a Web-browser-based context analysis interface for content providers. This interface may be, e.g., an interface to context processing module 166 of search server 160 shown in FIG. 2. The content developer may navigate his own browser to this interface and enter (e.g., by copying and pasting) appropriate content from the hosting page. In other embodiments, the content developer may navigate a browser to the search provider's context analysis interface and submit a URL for the hosting Web page. In still other embodiments, the search provider may distribute a software tool (e.g., incorporating aspects of context processing module 166) that the content provider can use to select content and submit it to the search provider without using a Web browser. This tool may take various forms, such as a desktop tool or a widget that can be integrated into various Web content development software programs.

Upon receiving content from a developer, context processing module 166 analyzes the content and generates a context vector. FIG. 8 is a flow diagram of a process 800 that may be implemented in context processing module 166. Process 800 begins when content to be associated with a contextual search interface is received by context processing module 166 (step 802).

At step 804, the received content is tokenized. Tokenizing may be done using conventional techniques and may include, e.g., detecting word boundaries, canonicalizing words (e.g., removing suffixes, correcting spelling errors or variants, and the like), eliminating various words that are too common to be helpful in searches (e.g., "the," "and"), and so on. At step 806, the tokens are sorted according to suitable criteria, such as frequency of occurrence of the term in the content, and at step 808 the most frequently occurring tokens are selected for inclusion in the context vector. The number of tokens selected may be limited, e.g., to some integer K.

At step 810, a context vector is created using the tokens. In one embodiment, the context vector includes the selected tokens as well as their respective frequencies and other optional information. In some embodiments, co-occurrences and correlations between tokens are also used to identify phrases that can also be incorporated into the context vector. (For instance, in content 302 of FIG. 3, the phrase "Golf Cabrio" might be identified.) In addition, URLs (or other identifiers) of any linked-to documents included in the content or a URL (or other identifier) for the content itself may also be included. More generally, any information representative of the content, or some aspect of the content, may be included in a context vector.

At step 812, the context vector is inserted into a block of generic code implementing a contextual search interface. In one embodiment, the generic code block includes a template for an enhanced URL that is to be used for sending contextual queries to the search server, and step 812 includes inserting the context vector (or an encoded representation thereof) into this template. The generic code block may also include other code, such as code for inserting the user's query into the enhanced URL before sending it to the search server, code for displaying the contextual search interface in its active and/or inactive states, and so on. The resulting code block, including the context vector, is returned to the content developer at step 814.

Referring again to FIG. 7, at step 708 the content developer receives the code block from context processing module 166. At step 710, the content developer inserts the code block into the hosting Web page at the desired point, thereby adding the contextual search interface to the page.

It will be appreciated that the processes for creating contextual search interfaces described herein are illustrative and that variations and modifications are possible. Steps described as sequential may be executed in parallel, order of steps may be varied, and steps may be modified or combined. Various steps such as selection of content and insertion of the contextual search code block may be automated or performed manually. In one alternative embodiment, the search provider may provide a context processing module that can be installed and run on the content provider's system, so that information need not be sent to the search provider in order to create the context vector. In addition, in some embodiments creation of contextual search interfaces may be automated, e.g., so that a context vector is automatically updated when page content is updated. For instance, if page 400 of FIG. 4 represents a news page where the top stories are frequently changed, a process may be provided for automatically updating the context vector for one of the contextual search interfaces any time its associated story changes.

Other algorithms for generating context vectors may also be implemented. For example, some algorithms may weight terms that appear in headings, subheadings, metatags or other selected fields higher than terms in the body text. Some algorithms may also take into account non-textual content (e.g., images or media content) for which suitable content descriptors are available or can be determined. Terms in the context vector are not limited to single words; a term may also be a phrase (2 or more words occurring adjacent to each other). In some embodiments, the context vector may be created based on information other than terms found in the content. For instance, the content provider may be prompted to specify a category or other context identifier for the content, and this information may be included in the context vector. In another embodiment, the context vector may include information about links included in the content (e.g., the URLs of such links or category information for the linked-to pages).

In some embodiments, the context vector may be included in the contextual search interface code block in an encoded form. For example, hash functions or other suitable techniques may be used to represent various tokens in the context vector. As another example, the complete context vector data might be stored in a table or database accessible to the search server, and the code block might include a key or other code that the search server can use to look up the context vector data during query processing.

B. By Users

In another embodiment, a user viewing any Web page can create a contextual search interface for that page (or for a portion thereof). For example, the search provider may provide a browser toolbar that has a "contextual search" widget enabling the user to select as context for a search query a portion of any Web page displayed in the browser window.

Figure 9:
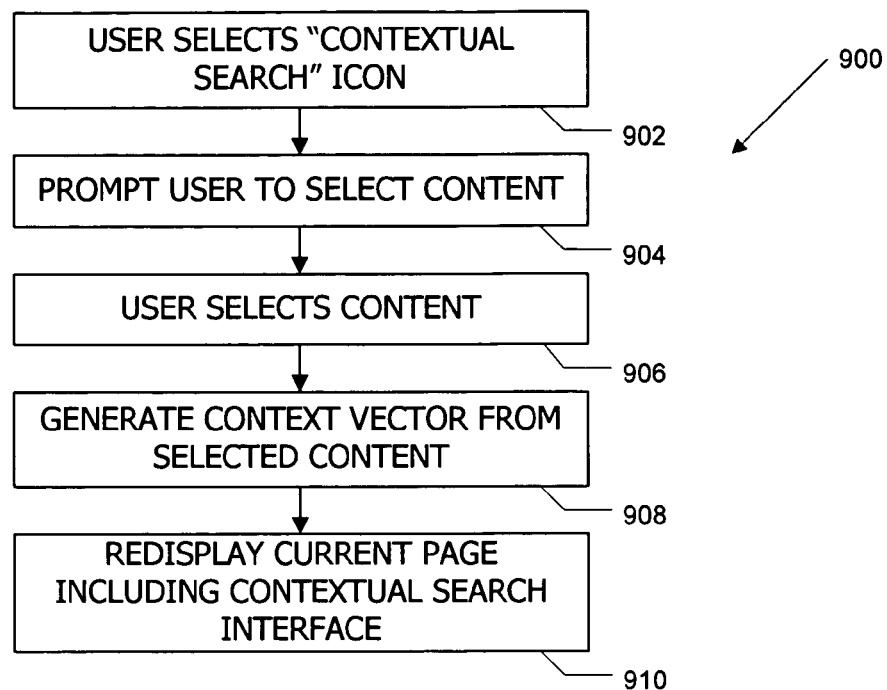
FIG. 9 is a flow diagram of a process for user creation of a contextual search interface according to an embodiment of the present invention.

FIG. 9 is a flow diagram of a process 900 for user creation of a contextual search interface. When process 900 begins, the user is viewing a Web page using a browser (e.g., an aspect of user interface module 127 of client application 125 of FIG. 2). The user's browser is equipped with a toolbar that has a "contextual search" widget. The page being viewed might or might not include a contextual search interface supplied by the content provider. At step 902, while viewing the page, the user selects the "contextual search" button from the toolbar, e.g., by clicking on it. In response, at step 904, the browser prompts the user to select a portion of the displayed page as context for the search. The prompt may include, e.g., changing a mouse cursor to a shape indicative of selection, and/or displaying a text prompt.

At step 906, the user selects part or all of the displayed page, e.g., by clicking and dragging a mouse cursor over a region of the displayed page. Selected text may be shown with highlighting (e.g., modified colors or a box drawn around the content) to provide visual feedback to the user. In some embodiments, other content selection mechanisms may be provided in addition to or instead of click-and-drag techniques. For example, a user may be able to select the entire page by pressing a predefined key, to select a paragraph by clicking while the mouse cursor is positioned anywhere in the paragraph, or to select a section by clicking while the mouse cursor is positioned in the section heading.

At step 908, client application 125 generates a context vector from the selected content. In one embodiment, client application 125 may submit the selected content to context processing module 166 at search server 160 for context-vector generation in accordance with process 800 described above. In another embodiment, client application 125 is configured to process content locally to generate a context vector (e.g., via steps of process 800) without transmitting information to the search server. Such processing capability may be implemented, e.g., by including a context processing module as part of specialized search module 126 of client application 125 of FIG. 2.

At step 910, the browser redisplays the current page, adding a contextual search interface at or near the selected portion of the page. In this embodiment, the newly added contextual search interface may appear initially in an active state so that the user can simply enter and submit a query without first activating the interface, or it may appear in an inactive state. Once created, a user-created contextual search interface advantageously behaves similarly to contextual search interface 304 described above; specifically, when the user enters a query through a user-created contextual-search interface, the client application submits the query and the context vector associated with the user-created contextual search interface to the search server.

It will be appreciated that process 900 is illustrative and that variations and modifications are possible. Steps described as sequential may be executed in parallel, order of steps may be varied, and steps may be modified or combined.

For instance, the user may select the content first, then activate a "contextual search" button in the search toolbar. Instead of adding a contextual search interface to the Web page, a user-created contextual search interface may be placed in the toolbar (e.g., in place of a standard non-contextual search interface) or provided in a separate pop-up window.

In other embodiments, rather than generating a context vector in advance of a query, the client application may send the selected content together with the user's query to the search server, and the search server may generate the context vector (e.g., using context processing module 166) as part of its query processing activity. This context vector may be sent back to the client application, which may cache it for subsequent reuse.

In another embodiment, a user may be able to refine the context for a pre-existing contextual search interface, e.g., by selecting a portion of the accompanying text. Where such a selection is made, the context vector associated with the contextual search interface can be modified, e.g., to include only terms that appear in the selected text, thereby providing users a further degree of control over how the context is defined.

In still another embodiment, a client application might also include a module for creating contextual searches that is accessible via an icon on the user's desktop or in an operating system toolbar. Such a module may enable a user to create context vectors for performing contextual searches based on content other than Web pages, including documents open in a word processing or file viewer application, e-mail messages, instant messages, and the like. The user may activate this icon at any time, whether or not a browser is open, and may select content for creating the context vector from any document on her desktop (including any Web pages that happen to be displayed). The user-created contextual search interface for the selected content appears, e.g., in a pop-up window or dialog box located near the selected content, or in any other suitable user interface element. When the search is executed and results are returned, the client application advantageously opens a browser window for displaying the results and allowing the user to navigate to the hit pages or sites.

III. Use of Context Vectors in Query Processing

As described above, when a contextual search interface such as interface 304 of FIG. 3 is active, a user may initiate a contextual search by entering a query into text field 306 and operating submit button 308. In response, contextual information, which can aid the search server in responding to the user's query, is supplied via a context vector (e.g., context vector 400 of FIG. 4) that is associated with the contextual search interface and automatically delivered to the search server with the user's query.

A search server (e.g., search server 160 of FIG. 2) receives a contextual search query, which includes both the user's query and the context vector, and executes the search, e.g., using query response module 164. Algorithms for processing contextual search queries advantageously exploit the premise that the user's interest is likely to be related to the neighboring content; accordingly, the context vector, which represents that content, is advantageously used in generating search results. It should be noted that a user who does not want a search to be connected to surrounding content may use a different interface (e.g., a search toolbar or the search provider's Web interface) to perform a non-contextual search, and search server 160 may be configured to process both contextual and non-contextual queries.

Figure 10:
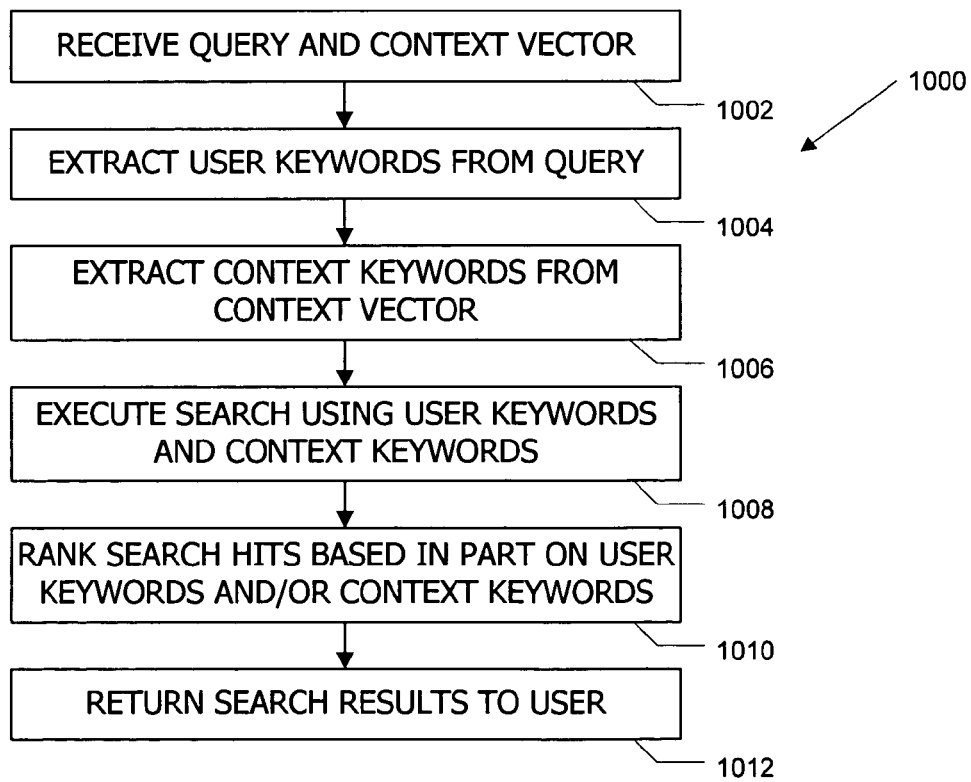
FIG. 10 is a flow diagram of a process for executing a contextual search according to an embodiment of the present invention.

Specific algorithms for processing contextual search queries will now be described. FIG. 10 is a flow diagram of one such process 1000, in which search terms provided by the user are supplemented using one or more additional terms from the context vector.

At step 1002, a contextual query, including at least one user-supplied term and an associated context vector, is received. At step 1004, one or more user keywords are extracted from the user-supplied terms, e.g., using conventional query parsing techniques, which may include detecting word boundaries, canonicalizing words (e.g., removing suffixes, correcting spelling errors or variants, and the like), eliminating words that are too common to be helpful in searches (e.g., "the," "and"), and so on.

At step 1006, one or more context keywords are extracted from the context vector to supplement the user keywords. In some embodiments, context vectors include terms that have already been parsed and canonicalized (e.g., as described for process 800 above) and so are already suitable for use as keywords. In other embodiments, parsing and canonicalization may be performed for terms in the context vector as well. In addition, step 1006 may include determining how many and which terms from the context vector should be used as context keywords. For instance, in some embodiments, only terms having at least a minimum frequency or weight might be selected, or a limit might be placed on the number of terms that can be selected, with the most frequent or highest weighted terms being selected first. The number of context keywords selected may also depend on the number of user keywords (e.g., for queries with more user keywords, fewer context keywords might be selected). Step 1006 may also include detecting and removing from the query any context keywords that are redundant with user keywords. Redundant keywords may include exact duplicates as well as known synonyms.

At step 1008, a search is executed using a query that includes the user keywords and the context keywords. Search execution may incorporate conventional techniques for identifying Web pages that contain one or more (or, in some embodiments, all) of the keywords; such pages are referred to herein as "hits" (or "search hits"). At step 1010, the search hits are ranked based on relevance as determined by a suitable ranking algorithm. Conventional algorithms for scoring each hit page based on frequency and/or proximity of keywords in the hit page may be used, with the user's keywords and/or the contextual keywords being taken into account in the scoring. In addition, any terms from the context vector that were not selected as keywords may be used in determining page scores or rankings. Other criteria, including the number of pages linking to the hit, user evaluations and preferences related to hit pages, and/or sponsorship of various hit pages may also be considered in determining the ranking.

At step 1012, the search results are returned to the user. In one embodiment, the results are returned as a Web page displayable via the user's browser, with links to the various hit pages or sites. The results page may be displayed, e.g., by redirecting the browser from the hosting page to the results page or by opening a new browser window for the results page. Where many hits are to be returned, multiple interlinked results pages may be generated. The results page may display both the user's original query and the context keywords that were added to the search query. In some embodiments, this information is presented using an interactive form via which the user can modify her query or the context keywords (or both) and submit the modified contextual query to search server 160.

Figure 11:
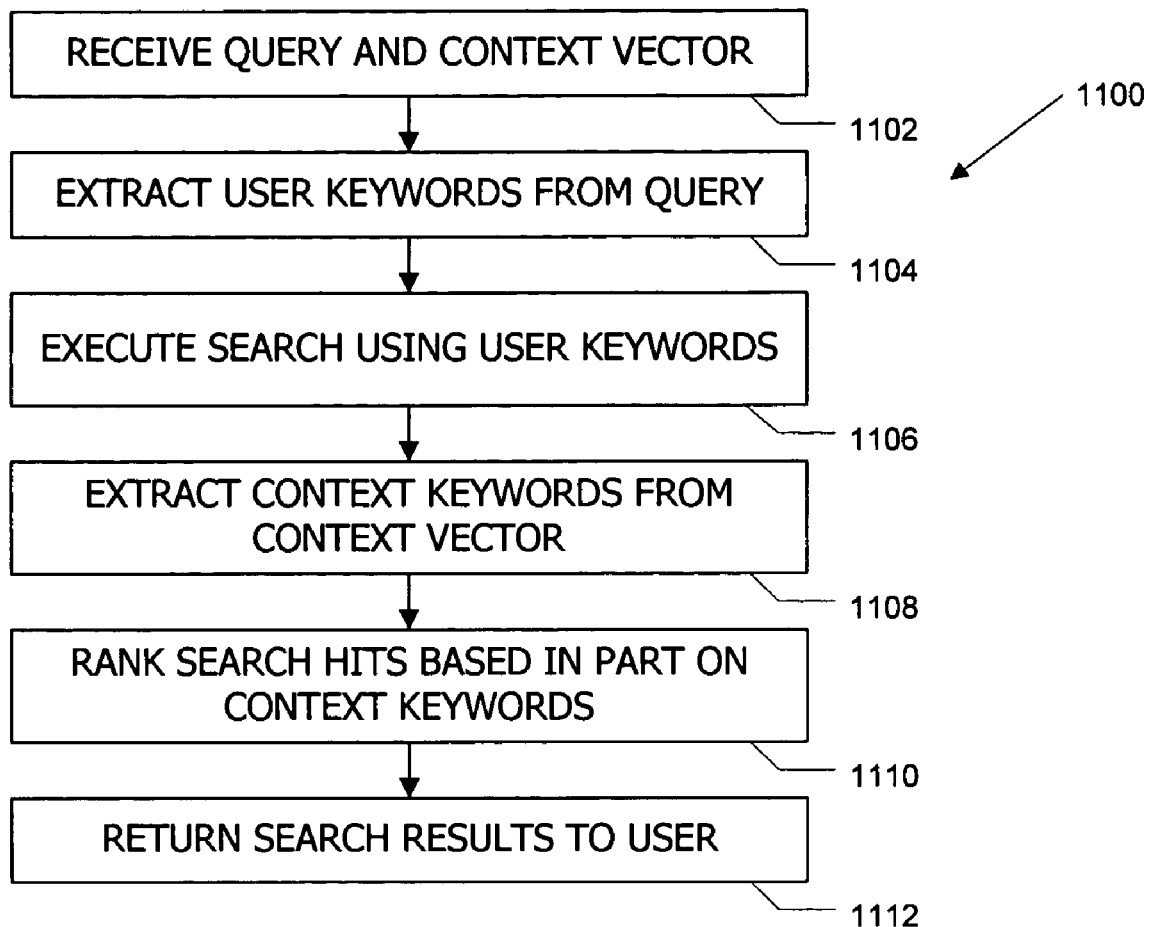
FIG. 11 is a flow diagram of another process for executing a contextual search according to an embodiment of the present invention.

FIG. 11 is a flow diagram of an alternative process 1100 for executing contextual searches. In process 1100, the user's query terms are used without additional context keywords to generate hits, and context data is incorporated into the ranking algorithm. More specifically, at step 1102, a contextual query, including at least one user-supplied term and an associated context vector, is received. At step 1104, one or more user keywords are extracted from the user-supplied terms; this step may be similar to step 1004 of process 1000 described above. At step 1106, a search is executed using a query made up of the user keywords, generating a list of hits. Unlike process 1000, keywords based on the context vector are not used to supplement the user keywords in the search query. As described for process 1000 above, search execution may be implemented using conventional techniques.

At step 1108, context keywords are extracted from the context vector; this step may be similar to step 1006 of process 1000 described above. At step 1110, the hits are ranked using the context keywords; in some embodiments, the user keywords may also be used for ranking The ranking algorithms may be generally similar to those used in step 1010 of process 1000. At step 1112, the results are returned to the user, similarly to step 1012 of process 1000. As in process 1000, the user's query and the context keywords may be presented using an interactive form via which the user can modify her query or the context keywords (or both) and submit the modified contextual query to search server 160.

It should be noted that processes 1000 and 1100 may result in lists of hits that differ as to content and/or order of the hits. Other variations in these processes are also possible. For instance some terms from the context vector may be used as context keywords in the search query while other terms are used only for ranking the hits. In another variation, only context keywords might be used for the search while user keywords are used only for ranking the search hits.

In any event, it should be understood that page rankings based on the user keywords and/or context keywords may be further modified based on other page ranking algorithms using various metadata for the query. Examples include the use of user profile data (if the user's identity is known), as well as various heuristics for resolving ambiguous terms, inferring local intent, etc. In addition to the list of hits, the search results page may also include sponsored results or other content as determined by the search provider.

IV. Augmenting Contextual Search Interfaces

As described above, a contextual search interface advantageously includes active and inactive states. In the inactive state, a small icon may be displayed (e.g., as shown in FIG. 5); this can reduce visual clutter on the page while still informing the user that a contextual search option is available. In the active state, a query form and submit control are displayed (e.g., as shown in FIG. 3).

In some embodiments, when the contextual search interface is active, the query form is augmented with additional content (referred to herein as "special content") that may be of interest to the user. In general, when a user chooses to activate an inactive contextual search icon, it can be inferred that the user is likely to be interested in content related to that context. The content augmentation feature allows such content (or links to such content) to be presented as part of an active contextual search interface and not presented (or hidden) for inactive contextual search interfaces. Special content can be selected dynamically based on the context vector of the contextual search interface that is being activated.

A. Examples of Special Content

In one embodiment, the special content includes shopping-related content via which opportunities to buy products (including goods and/or services) related to the content are offered to the user. For example, Web page 600 of FIG. 6, described above, includes summaries of different news stories 602, 604, 606, each with its own contextual search icon 612, 614, 616. A user may activate one of these icons, e.g., icon 612, by clicking on it, thereby causing an active contextual search interface to be displayed and "Shop in Context" content to be added to the displayed page.

FIG. 12 shows a portion of Web page 600 after contextual search icon 612 has been activated. Icon 612 has been expanded to an augmented contextual search interface 1202, which includes a search box 1204 and a submit control 1206 (labeled "Related Search" in this example) that operate similarly to previously described contextual search interfaces. Augmented contextual search interface 1202 also includes "Shop in Context" content 1208, which in this case provides links and text identifying sites where one can buy merchandise related to the subject of news story 602 (specifically, to the musician Bono).

The "Shop in Context" content or other special content for a contextual search interface is advantageously selected based on the context vector, so that activating a different contextual search interface on the same page will generally produce different "Shop in Context" or other special content. For example, FIG. 12 also includes an active contextual search interface 1212 associated with news story 604; interface 1212 would appear when contextual search icon 616 of FIG. 6 is activated. Contextual search interface 1212 includes a text field 1214 and a submit button 1216, as well as "Shop in Context" content 1216. Because story 604 relates to a different subject from story 602, "Shop in Context" content 1216 (which relates to Venus Williams) is different from content 1208.

Other interfaces for displaying special content and other types of special content may also be used. FIG. 13 shows an example of a hosting page 1300 that has content items 1302, 1304, as it might appear when displayed on client system 120 of FIG. 2. A contextual search ("Related Results") icon 1306, 1308 is placed near each content item 1302, 1304. Each icon 1306, 1308 corresponds to a contextual search interface in an inactive state; the interface is brought to an active state when the user activates it, e.g., by clicking on the icon using a conventional mouse or other pointing device. As with the contextual search interfaces described above, for each contextual search icon 1306, 1308, the source code (not shown) for hosting page 1300 includes a context vector. The context vector is not actually displayed in page 1300, although its data is included with the source code provided to client application 125 when page 1300 is requested.

A user who is interested in information related to a content item on page 1300 (e.g., content item 1304) selects the corresponding "Related Results" icon 1308, e.g., by clicking on it using a conventional mouse. When "Related Results" icon 1308 is selected, an information request including the context vector associated with icon 1308 is sent to search server 160 of FIG. 2. Search server 160 responds by providing to client application 125 various information items related to the context vector. These items can be displayed in an overlay window.

FIG. 14 illustrates an overlay 1402 that may appear when a user activates icon 1308. Overlay 1402 displays related information items that are identified based on a context vector associated with icon 1308. A user may perform a contextual search by entering a query into a text box 1412 and activating "Related Search" button 1414. As described above, the query that is sent by client application 125 to search server 160 for processing advantageously includes not only the explicit user input from text box 1412 but also a representation of the context vector associated with the active "Related Results" icon 1308.

In this embodiment, overlay 1402 also provides special content relevant to the context. A list of suggested search queries is presented in section 1404. These search queries can be generated based on the context vector. Overlay 1402 also provides, in section 1406, a listing of related sites. This listing can be generated by search server 160, e.g., by executing a search using one or more of the suggested queries in section 1404. "More . . ." button 1408 enables the user to view additional results from the same search.

Related results overlay 1402 advantageously also includes special content generated by search server 160 interacting with content augmentation server 180. In some embodiments, the special content includes a "Related Transactions" section 1410 that provides links to transaction proposal pages hosted by one or more content providers who are "partners" of the provider of search server 160 or content augmentation server 180 (referred to herein as a "search provider"). As used herein, a "partner" includes any content provider for which the search provider delivers links to the partner's content, including pay-per-click advertisers. A partner can be any content provider, including content providers whose servers are under common ownership or control with search server 160 as well as independent third-party content providers. In some embodiments, third-party partners have agreements with the search provider to pay for displayed links, e.g., on a pay-per-click basis.

The transaction proposal page advantageously presents terms for a possible transaction between the user and the partner, including but not limited to sale of some item to the user. The transaction proposal page may provide, e.g., an order form with some or all fields pre-filled, information about an item offered for sale with a further link via which the user can order the item, and so on. Upon viewing this page, the user may elect to accept the proposed transaction, view other possible transactions, or leave the partner's site.

Any type of transaction can be proposed. For example, as shown in FIG. 14, a proposed transaction for a content item related to a golf tournament might provide a link to a Web page where users can reserve tee times to play the course where the tournament is being held. Such a page can be maintained, e.g., by the operator of the golf course or by a travel service provider that is capable of making tee time reservations with the operator of the golf course. Another proposed transaction for a content item related to golf might provide a link to a Web page where users can purchase golf balls. Still other examples of transactions that might be proposed include: a link to a page where a user can buy plane tickets to a city mentioned in the content item; a link to a page where a user can rent a DVD or buy tickets to a movie mentioned in the content item; and so on.

The selection of partners and transaction proposals to be included in section 1410 is advantageously based at least in part on the context vector associated with icon 1308. Examples of selecting partners and transaction proposals are described below.

It will be appreciated that the contextual search interface described herein is illustrative and that variations and modifications are possible. For instance, when a user activates a "Related Results" icon (e.g., icon 1306 or 1308), search server 160 may also receive other metadata in addition to the context vector, such as an identifier of the user (if known), the user's IP address, the time of day, and so on. This metadata, which might or might not be specific to the hosting page or the contextual search interface, may be obtained from client application 125 or from other sources and can be used to select providers and/or transactions or other special content to be displayed.

As described above, any number of contextual search interfaces may be provided on a hosting page, and each contextual search interface may have its own context vector that reflects a different portion of the page content. In some embodiments, the creator of a hosting page (referred to herein as a "webmaster") may determine how many contextual search interfaces to include on the page, where they are to be located, and which portion(s) of the page should be used to define the context for the search. The webmaster may also be able to select the elements to be included in a contextual search interface, e.g., whether the interface includes a query box, list of related queries, search results, related transactions, and so on. Contextual search interfaces are also not limited to particular types of content or any particular combination of content types.

In accordance with an embodiment of the present invention, when a user activates a contextual search icon, special content is dynamically generated. For example, client application 125 or search server 160 may transmit the context vector associated with an activated icon to content augmentation server 180, which uses the context vector to select one or more related transactions to be proposed to the user. These transactions are returned to client application 125 for displaying.

Special content is not limited to shopping or advertising information. Other types of special content might include links to news stories related to the content, links to the most popular Web sites related to the content, related images or media content, or any other type of content. Any type of special content can be selected based on the context vector, e.g., by accessing an appropriate database using the context vector, and special content can be selected by search server 160, content augmentation server 180 or another server or computer system capable of communicating with client application 125. For instance, links to related news stories might be generated by querying one or more news servers or news sites using selected terms (or all terms) from the context vector. A list of the most popular related sites can be generated, e.g., by obtaining a listing of most popular sites and identifying sites from that list that contain terms from the context vector. Related images can be located by accessing an image database.

B. Selection of Special Content

Figure 15:
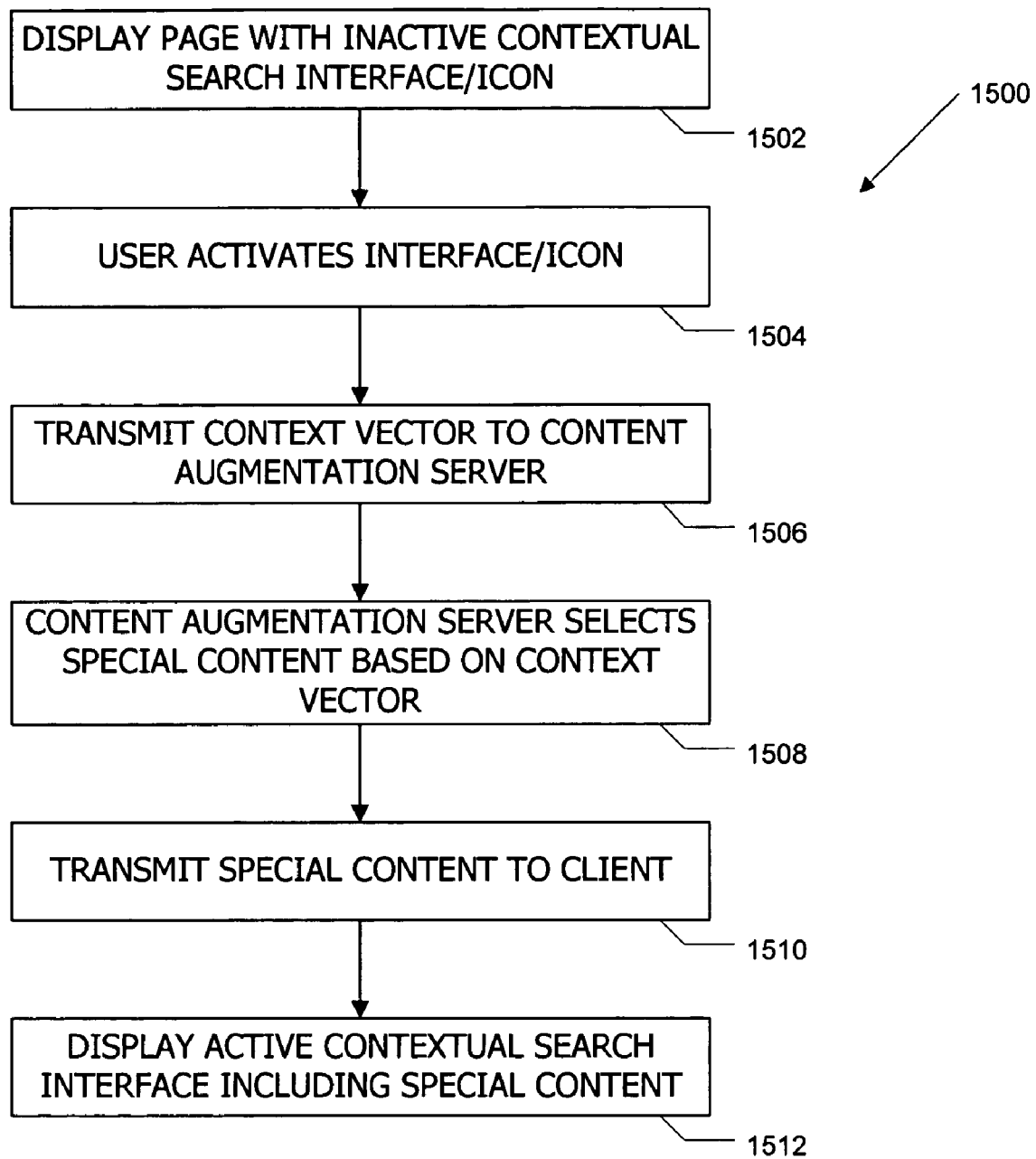
FIG. 15 is a flow diagram of a process for selecting augmented content according to an embodiment of the present invention.

FIG. 15 is a flow diagram of a process 1500 for generating an augmented contextual search interface that includes special content (e.g., "Shop in Context" content). At step 1502, a hosting page, such as page 600 of FIG. 6 or page 1300 of FIG. 13, is displayed in the user's browser. As described above, the hosting page includes one or more contextual search interfaces, each in the inactive (icon) state. At step 1504, the user activates one of these interfaces, e.g., by clicking on it. At step 1506, a content request that includes the context vector for the newly activated interface is transmitted to content augmentation server 180.

At step 1508, content augmentation server 180 generates or selects special content to be added to the hosting page based on the context vector. For example, content augmentation server 180 may access sponsored content database 162 (shown in FIG. 2), which advantageously associates specific items of sponsored content with various keywords. Content augmentation server 180 can extract keywords from the received context vector and select one or more items of sponsored content from database 162 based on the keywords. The number of items selected may be limited if desired (e.g., in FIG. 12, two items are selected for each contextual search interface). Where more than the maximum number of items match the keywords, selection among the items can be based on various criteria, e.g., the number or importance of the keywords matched by each item and/or the terms of sponsorship agreements between a provider of content augmentation server 180 and various sponsors of the content in database 162.

At step 1510, content augmentation server 180 returns the special content to client application 125, which displays the active contextual search interface (step 1512) including the special content. The active contextual search interface may be displayed inline, with any hosting page content following the insertion point of the contextual search interface being moved down as needed to make room for the special content (as shown in FIG. 12), or in an overlay (as shown in FIG. 14), new window, new browser tab, or the like.

It will be appreciated that the process described herein is illustrative and that variations and modifications are possible. Steps described as sequential may be executed in parallel, order of steps may be varied, and steps may be modified or combined. In some embodiments, the special content may be selected in advance, e.g., when the contextual search interface is created or updated, and incorporated into the source code for the hosting page so that a real-time request to a content augmentation server is not required. It is to be understood that where a hosting page includes multiple contextual search interfaces, special content can be displayed for any active interfaces without also being displayed for any inactive ones.

More generally, the context vector associated with a contextual search interface can be used in a variety of ways to identify related content. Using the content augmentation systems and methods described herein, displaying of special content is advantageously deferred until the user has indicated interest in such content by activating a contextual search interface. Thus, the amount of information related to a particular topic that is displayed can be made dependent on the user's expressed interest in the topic.

C. Generating Transaction Proposals

Figure 16:
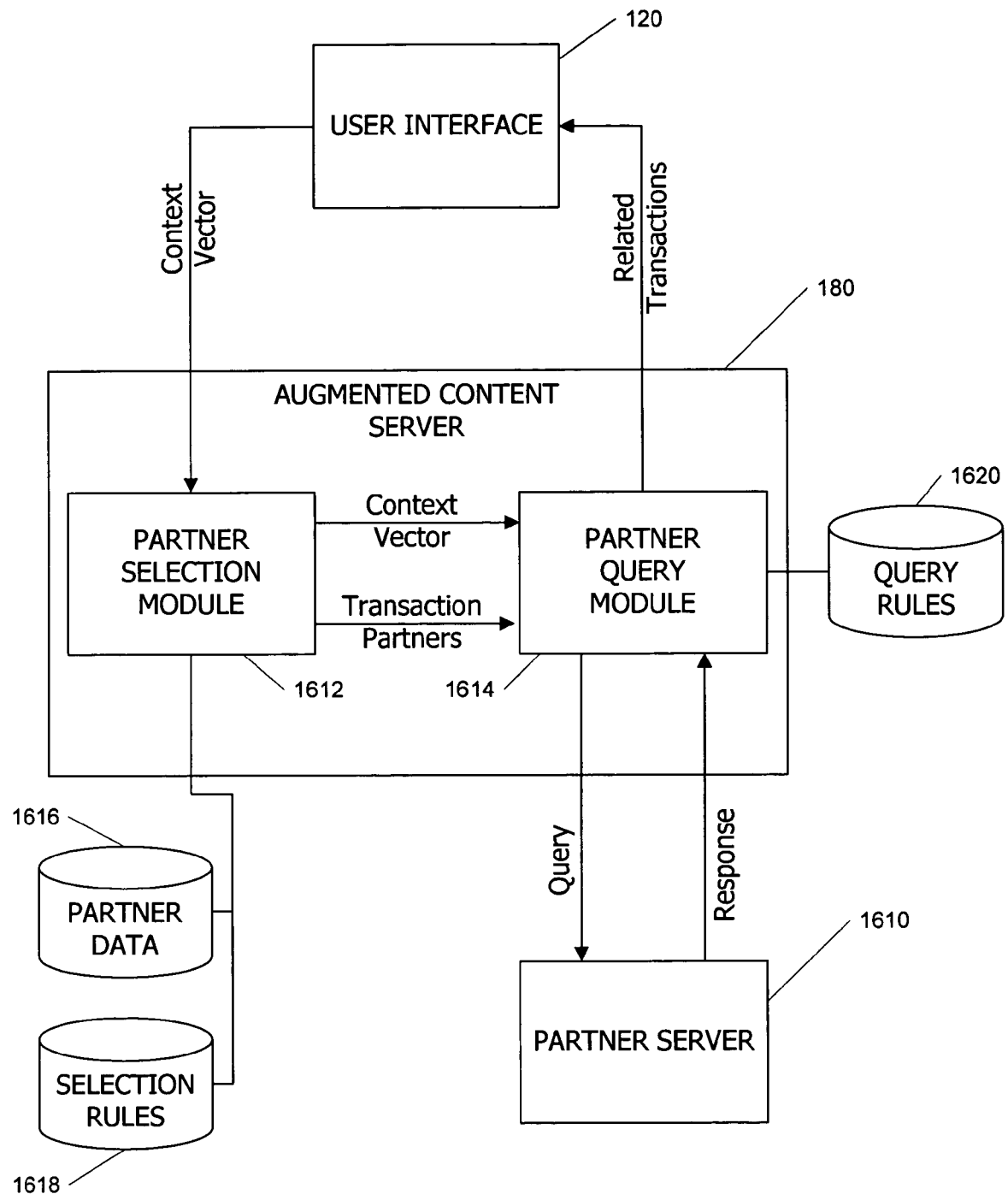
FIG. 16 is a block diagram of a content augmentation server according to an embodiment of the present invention.

In embodiments where the special content includes a transaction proposal, suitable proposals can be dynamically generated using a suitably configured content augmentation server, an example of which will now be described. FIG. 16 is a block diagram showing a content augmentation server 180 communicating with a client system 120. In one embodiment, communication between content augmentation server 180 and client system 120 occurs via Internet 140, as shown in FIG. 2. In another embodiment, client system 120 communicates via Internet 140 with search server 160, and search server 160 in turn communicates with content augmentation server 180, e.g., via Internet 140, a private network, or other network. Alternatively, search server 160 and content augmentation server 180 may be implemented in the same computer system. It will be appreciated that a particular communication path is not required.

Content augmentation server 180 also communicates with one or more partner servers 1610, which might correspond to one or more of content servers $150_1$ to $150_N$ of FIG. 2, via the Internet or other suitable communication channel(s). Partner server 1610, which may be any server operated by or for a partner of the search provider, is configured to receive and respond to user requests for information including requests related to purchasing goods and/or services. While FIG. 16 shows only one partner server 1610, it is to be understood that there might be any number of such servers and that different partner servers can be operated by or for different partners of the search provider; different partners and/or different partner servers need not have any affiliation with each other.

Content augmentation server 180 includes a partner selection module 1612 and a partner query module 1614. Partner selection module 1612 receives a context vector (directly or indirectly) from client system 120 and uses the context vector to select one or more partners as providers of proposed transactions. In some embodiments, the decision is based in part on information about various partners (e.g., types of goods or services offered) stored in a partner data store 1616 and in part on terms of advertising contracts between the search provider and various partners stored in a selection rules data store 1618. Examples of partner data and selection rules are described below. After one or more partner providers have been selected, partner selection module 1612 forwards identifiers of the selected providers along with the context vector to partner query module 1614.

Partner query module 1614 uses the context vector to formulate one or more queries to be transmitted to each selected partner. In general, different partners may have different rules relating to how queries are to be formatted, and partner query module 1614 applies these rules, which can be provided by the partners and stored in a "query rules" data store 1620. Partner query module 1614 transmits the queries to the partner servers 1610 and receives responses. Partner query module 1614 processes the responses to select one or more proposed transactions to transmit to client system 120; selection of proposed transactions is described below. In some embodiments, partner query module 1614 transmits the proposed transactions directly to client system 120; in other embodiments, partner query module 1614 transmits proposed transactions to search server 160, which incorporates the transactions into a contextual search interface that is transmitted to client system 120.

Figure 17:
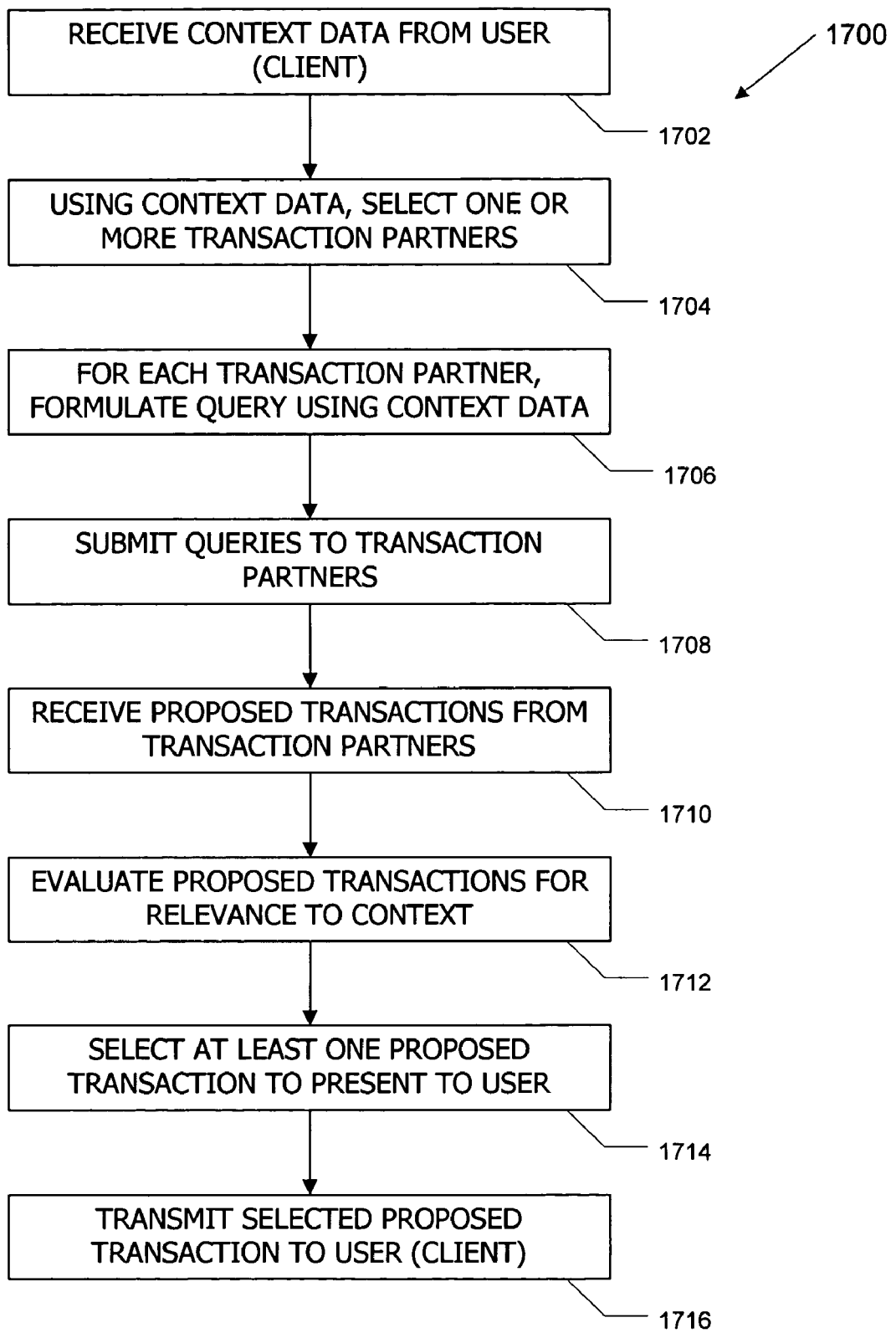
FIG. 17 is a flow diagram of a process for generating proposed transactions according to an embodiment of the present invention.

FIG. 17 is a flow diagram of a process 1700 for generating proposed transactions that can be implemented using content augmentation server 180 of FIG. 16. At step 1702, a context vector and/or other context data is received from the user (e.g., from client system 120 in response to user input).

At step 1704, using the context data, partner selection module 1610 selects one or more partners as transaction partners. Step 1704 advantageously includes comparing the received context data to partner data representing the products (including information and/or goods and/or services) available from the partner. For example, in one embodiment, each partner has an associated "fingerprint" or "partner vector" that is stored in partner data store 1616. The fingerprint may include any representation of the products provided by the partner. In one embodiment, a partner maintains a database of available products and periodically delivers a dump of that database (or selected portions thereof) to the search provider. The search provider operates a fingerprint generator that processes the data dump to generate a fingerprint representing the content of the data dump. The fingerprint, which can be generally similar in structure to a context vector, advantageously includes information about terms in the data dump and frequencies of those terms. In another embodiment, the search provider provides the partner with software that can be used to process the partner's database to generate a fingerprint; the partner operates the software and transmits the resulting fingerprint to the search provider. In still another embodiment, the search provider assembles a fingerprint by crawling the partner's Web site and building a context vector representative of the content found on the site.

In other embodiments, step 1704 includes inferring from the context data a type of transaction that the user might be interested in, and using that inference to select a partner who offers transactions of that type. For example, if the context data relates to travel or to a common tourist destination (e.g., Paris), it might be inferred that the user would be interested in traveling somewhere, and a partner who is a travel agent might be selected. If the context data relates to a movie, it might be inferred that the user would be interested in seeing the movie, and a partner who sells movie tickets or rents movies for home viewing (e.g., on DVD or other suitable media) might be selected.

Any number of partners can be selected as transaction partners at step 1704, up to and including all partners. Once transaction partners are selected, partner selection module 1610 forwards identifiers of the transaction partners together with the received context vector to partner query module 1614.

At step 1706, partner query module 1614 formulates at least one query for each transaction partner, based at least in part on the context vector. In one embodiment, partner query module 1614 accesses query rules data store 1620 using the identifier of a potential provider and retrieves rules for formulating queries to that partner server 1610. The rules may include formatting rules specifying how to format a query so that it will be recognizable to partner server 1610, as well as rules specifying how many queries to submit, how many search terms per query, how to select search terms using a context vector, and so on.

The rules may vary depending on the configuration and capabilities of the partner servers. For instance, where partner server 1610 is able to process context vectors (referred to herein as being "context aware"), step 1706 may include incorporating a representation of all or part of the context vector into the query. Where partner server 1610 is not context aware, step 1706 may include selecting one or more terms from the context vector and inserting those terms into a properly formatted query for delivery to partner server 1610. In some embodiments, multiple queries may be formulated for a single partner server, with each query including different terms from the context vector or different combinations of terms from the context vector. In addition, terms not in the context vector may be added to the query; for instance, a term such as "plane ticket" might be added in a query to a travel agency partner even if it does not appear in the context vector or other received context data.

At step 1708, the queries are submitted to the partner server(s) 1610 of the transaction partners, and at step 1710, responses are received. The exact content of each response is controlled by partner servers 1610; each response advantageously includes at least one link to a page proposing a transaction between a user and the partner. In some embodiments where partner server 1610 is context aware, the response might include just the one transaction proposal that partner server 1610 determines to be most relevant to the context vector. In other embodiments, e.g., where partner server 1610 is not context aware, the response might include multiple transaction proposals.

At step 1712, the transaction proposals are evaluated for relevance to the user's context. In one embodiment, partner query module 1614 computes a context vector for each transaction proposal, e.g., by applying an algorithm for parsing and statistically analyzing the content of each transaction proposal page. The algorithm is advantageously similar to the algorithm used to generate context vectors for contextual search interfaces, e.g., as described above. The context vector for each link is compared to the context vector received from the user, and the transaction proposal is assigned a "relevance score" reflecting the degree of similarity between the two context vectors. In some embodiments, a relevance score is computed for every transaction proposal received from a partner; in other embodiments, the number of transaction proposals considered per query or per partner is limited, e.g., to the first two or five or ten or some other number of proposals.

At step 1714, at least one of the transaction proposals is selected for presentation to the user. Any number of transaction proposals may be selected; in preferred embodiments, the number is limited to a relatively small value (e.g., two, five, ten or some other small number) so that the transaction proposals will fit in an overlay or other contextual search interface structure. In some embodiments, the contextual search interface might include a "More . . ." control allowing the user to view a longer list of transaction proposals; the longer list would include some or all of the transaction proposals that were not selected at step 1714.

Various selection criteria may be used at step 1714. In one embodiment, the selection is based solely on the relevance scores of the various transaction proposals. In another embodiment, relevance scores for different transaction proposals from the same partner are compared to each other to select the most relevant proposal from that partner, after which the most relevant proposals selected for different partners are compared to select the most relevant transaction proposals overall.

In still other embodiments, selection is based at least in part on financial and/or contractual considerations. For example, where the partners have entered into pay-per-click agreements with the search provider and different partners have agreed to different payment amounts, relevance scores for each partner's proposals might be weighted by a factor reflecting that partner's per-click payment amount. In another embodiment, the agreement between a partner and the search provider might specify that the partner's proposals should be associated with particular context vector terms, contextual search interfaces, or hosting pages. Where applicable, such provisions may be taken into account during step 1714.

At step 1716, the transaction proposals selected at step 1714 are returned to the user as part of a contextual search interface. As noted above, in some embodiments, the transaction proposals can be sent indirectly, e.g., via search server 160. The proposals or links to pages presenting the proposals are added to the active contextual search interface as described above.

It will be appreciated that the content augmentation server and process described herein are illustrative and that variations and modifications are possible. Process steps described as sequential may be executed in parallel, order of steps may be varied, and steps may be modified or combined. The content augmentation server may have more, fewer, or different component modules from those described herein, and different modules may be implemented on the same computer system or different computer systems. Partner servers may communicate with a content augmentation server via the Internet and/or any other suitable channels. A transaction proposal may include transaction details (e.g., relevant dates, prices, etc.) and/or a link to a page where transaction details can be viewed. In preferred embodiments, no actual transaction occurs without the user's explicit approval, and the user's browser client is not redirected away from the hosting page (e.g., to a transaction page) without an explicit user instruction.

D. Revenue Sharing Model

In some embodiments, decisions regarding whether to include one or more contextual search interfaces on a particular Web page and whether such interfaces include transaction proposals and/or other types of special content rests with the webmaster responsible for maintaining that page. To encourage webmasters to include contextual search interfaces with special content, a search provider can offer a financial incentive to the webmasters.

For example, a revenue sharing model might be implemented, in which the search provider passes along a portion of its advertising revenue to webmasters who choose to include contextual search interfaces with special content in their pages or sites. In one embodiment, the search provider receives per-click payments from its partners when a user clicks through from a contextual search interface to a transaction proposal page. The search provider can agree to remit a portion of the per-click payment to the webmaster on whose page the contextual search interface appeared. Other revenue sharing models may also be employed, including models where payment is based on completed purchases by users who click through to a transaction proposal page, number of users who view an active contextual search interface with a transaction proposal, and so on.

V. Further Embodiments

Contextual search capability, context vectors, and proposed transactions have a variety of other embodiments and applications. Some examples will now be described; it is to be understood that these examples are illustrative and not limiting of the invention.

In some embodiments, context vectors can be also be used to facilitate entry of queries by users. For example, if a user begins to enter (e.g., by typing) a query into a search toolbar interface of a client application while viewing a hosting Web page, the client application might use context vector(s) from that page to generate auto completion suggestions for the query. This can be done regardless of whether a particular contextual search interface is active or inactive. For example, if at page 600 of FIG. 6, the user typed "V-E-N" into a search toolbar interface (not shown in FIG. 6), the client application might suggest "Venus" or "Venus Williams" as the intended text. The user could then hit the Enter or Tab key (or any other designated key) to accept the suggestion or just ignore the suggestion and keep typing. Similarly, if the user begins to type a query into a contextual search interface, the context vector for that interface may be used to generate auto completion suggestions for the user.

In other embodiments, the context vector may be used to implement a "queryless" search. From an active contextual search interface (e.g., interface 304 of FIG. 3), a user may simply activate the submit button without entering any query terms. If a contextual search with no user terms is submitted, the search server (or the client application) may be configured to construct and process a query based on the context vector or on selected terms from the context vector.

In some embodiments, the search server may collect data related to contextual searches and use this data to improve the results of such searches. Data may be collected, e.g., per context vector or per hosting page. The data may include log files containing queries that were received with a particular context vector or from a particular hosting page, clickthrough statistics indicating which hits users who entered the logged queries actually investigated, explicit user ratings of hit pages, and the like. This data may be used in various ways to improve the results of contextual searches. For example, when a query comes from a particular contextual search interface, the search server might include with the search results one or more suggestions for related queries that the user might want to explore next. The related queries can be determined, e.g., based on other queries that have frequently been received with the same context vector or from the same hosting page.

As another example, clickthrough data and/or explicit ratings data associated with hits resulting from searches using a given context vector or contextual search interface may be used to refine the scoring or ranking of search hits during processing of subsequent queries that include the same context vector or that originate from the same contextual search interface. For example, hit pages or sites that have been frequently visited or highly rated by previous users having a particular context (as represented by the context vector) are relatively likely to be useful to subsequent users having the same context; such hits may have their scores or rankings adjusted upward so that they receive more prominent placement. Conversely, hits that have been generally ignored or that have received low user ratings within a particular context are less likely to be relevant and may have their scores or rankings adjusted downward.

In addition, aggregated data about queries and/or clickthroughs originating from a particular contextual search interface may be shared with the webmaster responsible for that contextual search interface, preferably without identifying individual users. The webmaster can use such data to gain insight into the interests and behavior of users who visit the site, which may help the webmaster to improve the usefulness and popularity of the site.

Query and/or clickthrough data may also be used for content augmentation. For instance, when a user activates a contextual search interface, the special content may include a list of the most frequent queries submitted via that interface or the sites most frequently visited by previous users of that interface. These queries or sites may be presented using active links so that the user can execute one of the queries or visit a site by clicking the link.

In some embodiments, a search server (or another server) may collect data about existing contextual search interfaces and define relationships between them based on their respective context vectors. For example, a "similarity" relationship might be defined between two interfaces that have a certain fraction of context vector terms in common; a "refinement" relationship might be defined where one interface's context vector includes all of the terms of another interface's context vector plus at least one additional term. In this manner, a graph with contextual search interfaces as nodes and the relationships as edges may be defined. A representation of the graph may be used during query processing. For instance, suppose that a contextual search interface A is a refinement of a contextual search interface B. When a query is submitted via interface B, terms from the context vector of interface A might be used in processing the query. Other relationships, including indirect relationships (e.g., if A is a refinement of B and B is a refinement of C, then it can be inferred that A is a refinement of C), may also be defined and used in query processing.

In some embodiments, data related to clickthroughs from special content such as transaction proposals and/or completed purchases resulting from such clickthroughs can be collected for each context vector or for groups of similar context vectors. This data can be mined to determine the clickthrough and/or completion rate for specific transaction types and/or specific transaction partners in association with a particular context vector. Such information can be used to refine the rules for selecting partners and/or types of transactions to propose for that context vector or group of context vectors.

Other embodiments include user personalization features allowing data specific to the user as well as the context to inform the selection of proposed transactions and/or contextual search results. For example, the search provider may maintain a user profile for each registered user of its services. When a registered user who is logged in executes a search (contextual or otherwise) or clicks through to a proposed transaction from a contextual search interface, information about that operation can be recorded and associated with the user. By analyzing patterns in a given user's behavior, a "user vector" may be developed. During selection of special content, information from the user vector as well as the context vector may be used in selecting partners and/or transaction types to propose. For instance, partners might be selected or proposed transactions ranked based in part on information about the types of transactions the user has entered into in the past (e.g., buying tickets, books, etc.), which partners the user has dealt with in the past, whether the user has bookmarked or otherwise saved a partner's site, explicit ratings given by the user to a partner or to the partner's site, and so on. Such information can also be used during contextual search processing, e.g., in identifying and/or ranking search results.

In still other embodiments, a contextual search query can be submitted to any search server, and different contextual searches can be submitted to search servers controlled by different entities, e.g., by configuring the contextual search interface so that the URL for submitting queries directs them to the desired search server. For instance, if a contextual search interface relating to automobiles is created and if a specialized server (with search capability) for automobile information is available on the Web, the contextual search may be routed to that server by including an Internet address of that server in the URL. In this way, contextual searches can provide users with access to search servers that are especially suited to their contexts, without the users having to know in advance that such a server exists. The ability to automatically direct a query to an appropriate server in a context-dependent manner may further enhance the appeal of contextual searches to users.

Selective routing of contextual queries may be implemented in various ways. For instance, where contextual search interfaces are created by content developers, the content developer may construct a query URL directed to the address of any server on the Web and may enhance the query URL with a query appropriately formatted for the targeted server. Such enhanced URLs advantageously include contextual terms (e.g., a context vector) as well as user-supplied terms.

Similarly, where contextual search interfaces are generated automatically, a software module that generates such interfaces may be configured to select an appropriate search server and format for the query URL based on the context vector. It is to be understood that the selected search server need not have any organizational connection to a creator or promulgator of the interface-generating software module, provided that the software module is capable of generating code that will cause a request to be transmitted to the selected search server in a format that the selected search server is capable of processing.

Where the search query is to be directed to a specialized search server, the active state of the contextual search interface may include special content as described above. This special content may be provided by the specialized search server or by a content augmentation server that may be controlled by a different entity. The special content may include information about the search server to which the search will be directed, such as a link to the search server's Web site.

In yet another implementation, the decision as to where to direct a contextual search query might be made at query execution time. For example, all contextual search queries could be directed to a search server (e.g., search server 160 of FIG. 2), and the search server could determine, based on a combination of the user query and context vector information, whether to redirect the query to a different server for processing. In this implementation, the decision to redirect a query might be dependent in part on the user-supplied element of the query. For instance, suppose the content for a contextual search interface relates to a new album. If a user enters the query "review" via the contextual search interface, that query could be redirected to a database of music reviews, while if the user enters the query "buy" via the same interface, that query might be processed by the search server without redirecting.

In some embodiments, different contextual search queries may be directed to the same search server but limited to different portions of a search corpus. For example, a search provider may divide Web pages into a number of potentially overlapping "properties," such as a "news" property, a "shopping" property, a "sports" property and so on. Each such property can be treated as a separate search corpus, and based on the query and the context vector, a search may be directed to any one or more of these properties. Where searches across multiple properties are performed, the property that returned a particular result may also be used as a factor in ranking the results.

In even further embodiments, users may be able to create bookmarks for contextual search interfaces (or specific contextual queries) that they have found useful so that they can easily return to these interfaces. It will be appreciated that because contextual search interfaces return context-dependent results, not all such interfaces are likely to be equally useful to a particular user. When a user finds one that is useful, she may bookmark the page that contains it using conventional browser-based bookmarks or bookmarking functionality supported by a search toolbar; however, it will be appreciated that if the content of the hosting page changes, the context vector may change as well. Accordingly, some embodiments of the present invention enable the user to bookmark the contextual search itself, e.g., by saving the enhanced query URL that includes the context vector. When the user selects this bookmark, she is prompted to enter a query, and a contextual search is executed, using the new query. In some embodiments, the interface that prompts the user to enter a query may also provide special content, including proposed transactions. Alternatively, the user may be able to save the query as part of the bookmark so that selecting the bookmark at some later time re-executes a particular contextual search regardless of the current content of the hosting page.

Users may also be able to share their bookmarked contextual searches with other users, e.g., through various trust network mechanisms. In still other embodiments, users may be able to annotate and label their bookmarked (or otherwise saved) contextual searches or interfaces.

While the invention has been described with respect to specific embodiments, one skilled in the art will recognize that numerous modifications are possible. For instance, where specific input devices (e.g., computer mouse) are referred to herein, it is to be understood that different input devices (e.g., keystrokes or voice commands) can be substituted. Similarly, clickable buttons and other graphical user interface control elements referred to herein may be replaced by any suitable alternative control elements.

Further, although the embodiments described above use context data in the form of a context vector, any input data that provides a context indicating a user's likely interest may be substituted. Thus, "context data" can include a context vector and/or any other information that supplies context, including query terms submitted by the user, user-selected text or other content items, data extracted from the user's profile and/or search history, and so on.

The appearance of the contextual search interface in active and/or inactive states may also vary from that shown herein. For instance, the active interface may appear inline in the hosting page, or in an overlay, pop-up window, browser tab, browser toolbar, or in any other suitable location. In addition, the look of the icon and/or the active interface elements may be varied. Such variation may be controlled by a contextual search promulgator or a content provider (webmaster). As just one example, the look of the inactive icon may be varied to suggest the context; thus, a film reel might be included in an icon for entertainment-related searches, a football or baseball might be included in icons for sports-related searches, and so on. A consistent text string (e.g., "Search This" as shown in FIG. 6 or "Related Results" as shown in FIG. 13) or other element may be included in the icon as a further indication that the icon represents a contextual search interface.

In another variation, the inactive state of a contextual search icon may be implemented with hidden and visible modes. For example, the contextual search icon may be hidden (i.e., not displayed on the hosting page) except when the user's mouse cursor is positioned or moved over the associated content. When the mouse cursor is so positioned, the icon becomes visible and the user may click on it to activate it. Hidden and visible modes may be implemented, e.g., using a language such as Java.

In some embodiments, special content can be displayed without also providing a search interface. For example, a user might be able to activate a related information overlay, pop-up or inline expansion of the page that includes one or more proposed transactions or other special content chosen by a content augmentation server but does not include a search interface. In another embodiment, a content augmentation server can be implemented as a transaction search server. In this embodiment, the content augmentation server can provide an interface page via which the user can select or type a description of a desired transaction (e.g., "buy plane tickets to Paris" or "buy DVD"). Using the user-supplied transaction information as context data, the content augmentation server interacts with transaction partners in a manner generally similar to that described above to formulate a list of proposed transactions that can be returned to the user. In this embodiment, a longer list of proposed transactions might be presented to the user.

The embodiments described herein may make reference to Web sites pages, links, and other terminology specific to instances where the World Wide Web (or a subset thereof) serves as the search corpus. It should be understood that the systems and processes described herein can be adapted for use with a different search corpus (such as an electronic database or document repository) and that results may include content as well as links or references to locations where content may be found.

Computer programs incorporating various features of the present invention may be encoded on various computer readable media for storage and/or transmission; suitable media include magnetic disk or tape, optical storage media such as compact disk (CD) or DVD (digital versatile disk), flash memory, and carrier signals adapted for transmission via wired, optical, and/or wireless networks conforming to a variety of protocols, including the Internet. Computer readable media encoded with the program code may be packaged with a compatible device or provided separately from other devices (e.g., via Internet download).

In addition, the invention has been described with reference to computer systems having particular hardware and software elements. It is to be understood that other systems with different combinations of hardware and/or software components could also be implemented.

Thus, although the invention has been described with respect to specific embodiments, it will be appreciated that the invention is intended to cover all modifications and equivalents within the scope of the following claims.

What is claimed is:

1. A computer-implemented method performed by an information server computer for communication transaction proposals to a user, the method comprising:
  for each of a plurality of partners, storing in a location accessible to the information server computer, partner data representing products available from that partner;
  receiving, at the information server computer, a request from a user for information related to a currently presented content item, the request including context data representing content of the currently presented content item, wherein the content item is a World Wide Web page;
  selecting at least one of the partners as a transaction partner, wherein the selection is based at least in part on comparing the context data to the stored partner data for the plurality of partners;
  obtaining at least one transaction proposal from each transaction partner; and
  transmitting a representation of at least one of the obtained transaction proposals to the requesting user,
  wherein the act of obtaining a transaction proposal includes:
    for each transaction partner:
      formulating a query, the query being based at least in part on the context data;
      submitting the query to a partner server associated with the transaction partner; and
      receiving a response to the query from the partner server, the response including at least one transaction proposal; and
      selecting at least one of the received transaction proposals for transmission to the requesting user.

2. The method of claim 1 wherein each transaction proposal includes a transaction page configured to present terms of a proposed business transaction between the user and the transaction partner.

3. The method of claim 2 wherein the proposed business transaction is for a purchase of goods or services by the user.

4. The method of claim 2 wherein the representation includes a resources identifier of the transaction page.

5. The method of claim 4 wherein the act of transmitting includes transmitting the resource identifier of the transaction page to the requesting user.

6. The method of claim 4 wherein the act of transmitting includes transmitting an instruction to insert a link to the transaction page into the currently presented content item.

7. The method of claim 4 wherein the act of transmitting includes transmitting the resource identifier of the transaction page to an intermediary server, wherein the intermediary server includes the resource identifier as special content to be transmitted to the user.

8. The method of claim 2 wherein the act of transmitting includes transmitting an instruction to display a link to the transaction page in an overlay window.

9. The method of claim 8 wherein the overlay window further includes a search interface.

10. The method of claim 1 wherein the act of selecting at least one of the received transaction proposals includes:
  generating a representation of content of each received transaction proposal; and
  determining relevance of each received transaction proposal based at least in part on comparing each generated representation to the context data received from the user,
  wherein the transaction proposal determined to be the most relevant is selected.

11. The method of claim 1 wherein the partner data for at least one of the partners is supplied by the partner.

12. The method of claim 1 wherein the partner data for at least of the part partners is generated based on a data dump from a partner server associated with the partner.

13. The method of claim 1 wherein the user requests information by activating a contextual search interface included in the currently presented World Wide Web page.

14. The method of claim 1 wherein the user is a human.

15. The method of claim 1 wherein the user is a computer.

16. A computer-implemented system for communicating transaction proposals to a user, the system comprising:
  an information server computer;
  a data store configured to store information about each of a plurality of partners, the information including partner data for each partner, the partner data representing products available from the partner, the information being accessible to the information server computer;
  partner selection control logic communicably coupled to the data store,
  the partner selection control logic being configured to receive at the information server computer a user request for information, the request including context data representing content of a currently presented content item, and to select at least one of the partners as a transaction partner, wherein the selection is based at least in part on comparing the context data to the partner data in the data store; and
  partner interaction control logic coupled to receive identifiers of the selected transaction partners from the partner selection logic and configured to obtain at least one transaction proposal fro each transaction partner and to transmit at least one of the obtained transaction proposals to the requesting user,
  wherein each transaction proposal includes a transaction page configured to present terms of a proposed business transaction between the user and the partner,
  wherein the partner selection control logic is further configured red to obtain the at lest one transaction proposal by:
    for each transaction partner:
      formulating a query, the query being based at least in part on the context data;
      submitting the query to a partner server associated with the transaction partner; and
      receiving a response to the query from the partner server, the response including at least one transaction proposal; and
    selecting at least one of the received transaction proposals for transmission to the requesting user.

17. The system of claim 16 wherein the representation includes a resource identifier of the transaction page.

18. The system of claim 16 wherein the proposed business transaction is for a purchase of goods or services by the user.

19. The system of claim 16 wherein the partner interaction control logic is further configured to formulate a query for each transaction partner, the query being based at least in part on the context data; to submit the query to a partner server associated with the transaction partner; to receive a response to the query from the partner server, the response including at least one transaction proposal; and to select at least one of the received transaction proposals for transmission to the user.

20. The system of claim 19 wherein the partner interaction control logic is further configured to select at least on of the received transaction proposals by generating a representation of content of each received transaction proposal and determining relevance of each received transaction proposal based at least in part on comparing each generated representation to the context data received from the user, wherein the transaction proposal determined to be most relevant is selected.

21. A computer-implemented method for communicating a transaction proposal to a user, the method comprising:
    presenting to a user, by a client-computer, a content item including an activatable icon, the icon being associated with the content of presented content item, wherein the content item is a World Wide Web page;
    in response to user activation of the icon, transmitting, by the client computer, context data representing the associated content to an information server;
    receiving, at the client computer, a response from the information server, the response including a reference to a transaction proposal, the transaction proposal being selected based at least in part on the context data; and
    presenting to the user, by the client computer, an interface including the reference to the transaction proposal,
        wherein the information server is configured to obtaining the transaction proposal by:
            for each of a plurality of transaction partners:
                formulating a query, the query being based at least in part on the context data;
                submitting the query to a partner server associated with the transaction partner; and
                receiving a response to the query from the partner server, the response including at least one transaction proposal; and
            selecting at least one of the received transaction proposals for transmission to the requesting user.

22. The method of claim 21 wherein each transaction proposal includes a transaction page.

23. The method of claim 22 wherein the proposed business transaction is for a purchase of goods or services by the user.

24. The method of claim 21 wherein the reference to the transaction proposal is a hyperlink to a transaction World Wide Web page configured to present terms of a proposed business transaction between the user and the transaction partner.

25. The method of claim 24 wherein the hyperlink is included in a special content data block inserted inline into the hosting World Wide Web page.

26. The method of claim 24 wherein the hyperlink is included in a special content data block presented in an overlay window.

27. The method of claim 21 wherein the reference to the transaction proposal is presented together with a contextual search interface configured to enable the user to search at least a portion of the World Wide Web using the context data and zero or more user-supplied search terms.

28. The method of claim 21 wherein the user is a human.

29. The method of claim 21 wherein the user is a computer.

* * * * *

UNITED STATES PATENT AND TRADEMARK OFFICE
CERTIFICATE OF CORRECTION

PATENT NO.         : 7,451,152 B2
APPLICATION NO.    : 11/129096
DATED              : November 11, 2008
INVENTOR(S)        : Reiner Kraft et al.

It is certified that error appears in the above-identified patent and that said Letters Patent is hereby corrected as shown below:

<u>On the Title Page</u>

Item (75), Inventors: after "Hartmann," delete "San Francisco, CA" and substitute --Gibraltar, GIBRALTAR-- in its place; and before "Maghoul," delete "Frazin" and substitute --Farzin-- in its place.

<u>In the Claims</u>

In column 32, claim 12, line 18, before "is generated based on" delete "of the part partners" and substitute --one of the partners-- in its place.

In column 32, claim 16, line 46, after "transaction proposal" delete "fro" and substitute --from-- in its place.

In column 32, claim 16, line 53, before "one transaction proposal" delete "red to obtain the at lest" and substitute --to obtain the at least-- in its place.

In column 33, claim 20, line 12, after "select at least" delete "on" and substitute --one-- in its place.

Signed and Sealed this

Twenty-third Day of June, 2009

JOHN DOLL
*Acting Director of the United States Patent and Trademark Office*